(12) United States Patent
Ichapurapu et al.

(10) Patent No.: US 11,553,416 B1
(45) Date of Patent: Jan. 10, 2023

(54) DYNAMIC MEMORY REALLOCATION AND OFFLOAD CHANNEL STATE INFORMATION (CSI) PROCESSING FOR DEVICE POWER SAVINGS

(71) Applicant: Amazon Technologies, Inc., Seattle, WA (US)

(72) Inventors: Ravi Ichapurapu, Morgan Hill, CA (US); Durga Laxmi Narayana Swamy Inti, Kakinada (IN); Amit Kachroo, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/387,719

(22) Filed: Jul. 28, 2021

(51) Int. Cl.
*H04W 52/02* (2009.01)
(52) U.S. Cl.
CPC ............... *H04W 52/0209* (2013.01)
(58) Field of Classification Search
CPC . H04W 52/00; H04W 52/02; H04W 52/0209; H04W 52/0216; H04W 52/0248; H04W 52/0251; H04W 52/0258; H04W 52/0261
See application file for complete search history.

(56) References Cited

U.S. PATENT DOCUMENTS

| | | | | |
|---|---|---|---|---|
| 10,063,342 B2 * | 8/2018 | Nabetani | ................ | H04B 7/068 |
| 10,187,110 B2 * | 1/2019 | Nabetani | ................ | H04B 7/086 |
| 10,505,703 B2 * | 12/2019 | Ouchi | ............... | H04W 72/0446 |
| 10,880,847 B2 * | 12/2020 | Kwak | ............... | H04W 52/0245 |
| 11,381,284 B2 * | 7/2022 | Ahn | ....................... | H04B 7/043 |
| 11,387,880 B2 * | 7/2022 | Zeng | .................... | H04B 7/0417 |
| 2007/0238437 A1 * | 10/2007 | Jaakkola | ........... | H04W 52/0251 |
| | | | | 455/343.1 |

* cited by examiner

*Primary Examiner* — Quochien B Vuong
(74) *Attorney, Agent, or Firm* — Lowenstein Sandler LLP

(57) ABSTRACT

Technologies directed to dynamic memory reallocation and offload channel state information (CSI) processing for device power savings are described. A method includes receiving, by a radio, first data from a processing device. The first data is sent to a second wireless device over a wireless channel. The method measures, by the radio, first CSI values that represent channel properties of the wireless channel. The method sends, by the radio, the first CSI values to the processing device with a first periodicity. The method receives, by the radio from the processing device, second data that specifies a transfer interval and an amount of memory to reserve in a memory buffer for second CSI values measured during the transfer interval. The method measures, by the radio, the second CSI values and sends the second CSI values to the processing device at the end of the transfer interval.

20 Claims, 13 Drawing Sheets

DYNAMIC MEMORY REALLOCATION AND OFFLOAD CHANNEL STATE INFORMATION (CSI) PROCESSING FOR DEVICE POWER SAVINGS

BACKGROUND

Many buildings, such as homes, retail stores, business centers, and the like, have a growing number of wireless transmission devices, including wireless transmitters and wireless receivers. These devices send an increasing amount of radio frequency (RF) energy through the buildings from many different directions. In addition, Wireless RF signals may be used in motion detectors to help detect human presence.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1A:
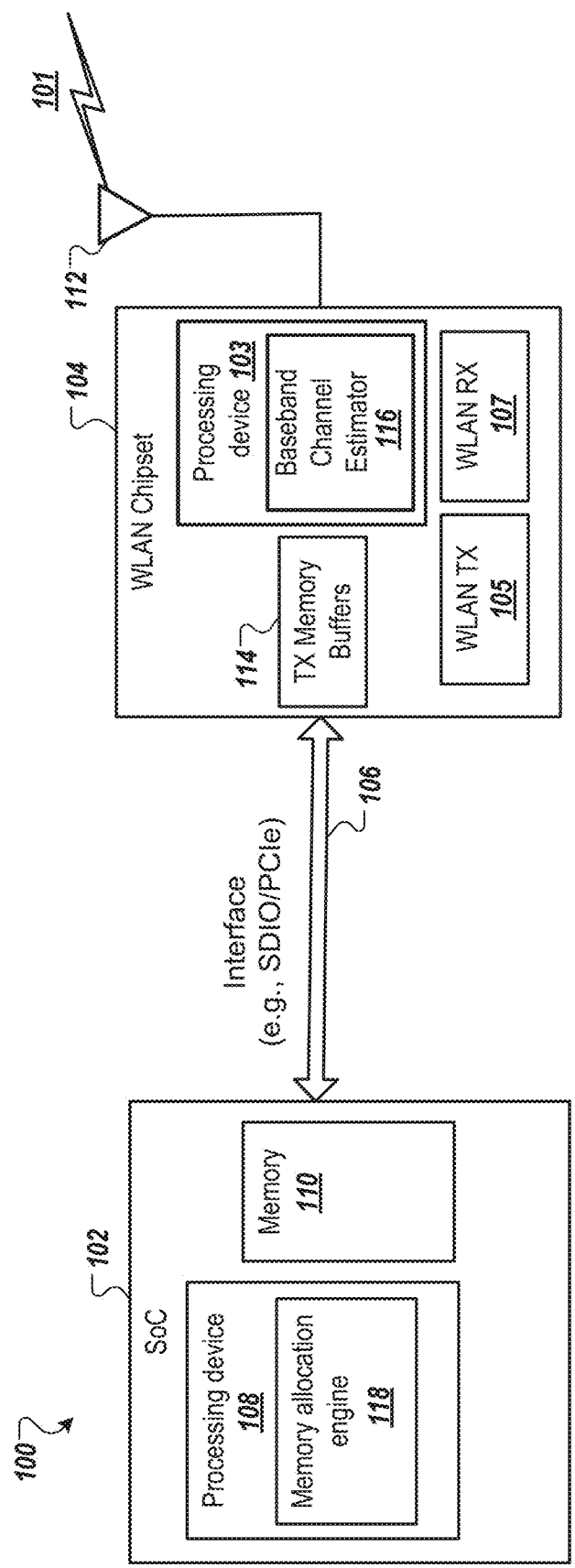
FIG. 1A is a block diagram of a wireless device with a System on Chip (SoC) and a wireless local area network (WLAN) chipset for dynamic memory allocation, according to at least one embodiment.

Technologies directed to dynamic memory reallocation and offload channel state information (CSI) processing for device power savings are described. Wireless radio frequency (RF) signals (or simply "wireless signals") may be employed to not only detect presence within line of sight, such as in the same room or space, but also in the adjacent room(s) because wireless signals may pass through walls. These RF signals may be generated via a wireless local area network (WLAN) device employing technology such as 2.4 GHz or 5.0 GHz WiFi®, Bluetooth®, ZigBee®, Zwave®, and the like. Wireless signals for presence detection may be an attractive option due to the ubiquity of wireless transceivers such as access points (AP) or base station devices present in so many buildings and homes.

The RF channel properties available through radio transmission channels may contain data that may be employed in machine learning techniques used to train, for example, a supervised machine learning (ML) model for presence classification. Examples of data that may carry RF channel properties include Received Signal Strength Indicator (RSSI) data, CSI, or a combination of both, as will be discussed in more detail. Additional sources of signal characteristics, power, channel properties, or other channel information may also be employed. Therefore, RSSI and CSI are but a listing of understood and available forms of channel properties. RSSI is a measurement value of power present in received wireless signals and contains a single value per packet. For example, RSSI can be measured as the power level of a radio frequency that a client device receives from an access point, such as a wireless router. RSSI may be a measurement of the energy observed at the antenna by a wireless physical layer (PHY) of the receiver used to receive a current Physical Layer Convergence Protocol (PLCP) Protocol Data Unit (PPDU) of the receiver. In a typical home WLAN, the client device generates the RSSI either based on the data frame received or the beacon from the AP. The RSSI fluctuates when the environment changes. Many factors can cause such changes: moving transmitter or receiver, moving objects nearby the AP or client, changing ambient noise level, etc. As opposed to the RSSI, which is a single value available per packet, the CSI includes the detailed channel impulse response with amplitude and phase information across all the Orthogonal frequency-division multiplexing (OFDM) subcarriers and is updated (at the maximum rate) every OFDM symbol. This provides more information about the environment under surveillance. Therefore, by the use of CSI, better detection can be accomplished. For example, a CSI signal can distinguish a person who is watching TV or washing dishes. However, RSSI based method is not able to distinguish them.

CSI data is granular, real-time data on the amplitude and phase of each channel subcarrier between the WLAN transmitter and receiver. Raw CSI data, provided by the chipset, is fed to a signal processing engine (DSP) for noise reduction, signal transforms, and/or signal extraction. The current implementations take these processed CSI data and run it through a machine learning (ML) model to determine whether the environment has been disrupted to the point of perceiving motion. In particular, feature extraction is done on the processed CSI data, and inference is made using ML models. The ML models can be "tuned" to prioritize latency, accuracy/sensitivity, using hysteresis or by applying a user-provided threshold for notification. In addition, the ML models and processing techniques are optimized to meet the application's key performance indicators (KPIs) and latency requirements.

CSI-based motion detectors do not require an "active transmitter" like a phone to be on a person in order to detect and track them. Rather, CSI-based motion detectors work based on disruption to the channel state information and multipath effects of WLAN transmission between APs, smart speakers, streaming devices, or the like.

To enable CSI-based applications, like Presence/Motion detection or localization, on these devices, these devices need to be continuously exchanging CSI packets at the predefined sampling rate. Continuously exchanging CSI packets, however, can introduce challenges with respect to power. In particular, when devices are not active, they transition to power savings where an SoC or application processor of the device enters power saving mode(s), such as a deep sleep mode. So, to process the CSI packets coming from the WLAN chipset at the order of tens of milliseconds, the SoC or application processor cannot enter the power saving mode(s), which can increase device power consumption by the device. Also, for devices not in the power saving mode(s), the continuous processing and interface utilization also increase power consumption.

Aspects of the present disclosure can overcome these challenges and others by providing dynamic memory reallocation and offload CSI processing for device power savings. One method includes receiving the first data from a processing device and storing the first data in a memory buffer. The first data is sent to a second wireless device over a wireless channel. The method measures first CSI values that represent channel properties of the wireless channel. The method sends the first CSI values to the processing device with a first periodicity. The method receives, from the processing device, second data, including a first parameter value that specifies a transfer interval and a second parameter value that specifies an amount of memory to reserve in the memory buffer for second CSI values measured during the transfer interval. The method measures and stores the second CSI values in the memory buffer and sends the second CSI values to the processing device at the end of the transfer interval.

Aspects of the present disclosure can re-use transmit (TX) memory buffers to temporarily store the CSI values so that a lower power mode of the SoC or application processor is not disturbed. Commercial WLAN chipsets do not have dedicated memory for saving the CSI values, and the WLAN chipset provides them to a driver in real-time. So, to receive these periodic CSI values, the SoC or application processor and the corresponding memory interfaces need to be active. However, commercial WLAN chipsets have TX first-in-first-out (FIFO) memory buffers populated by the driver with the intended transmit packets. Aspects of the present disclosure, when the SoC or application processor is in a power-saving mode, there will not be any transmit activity at the WLAN chipset. So, the TX memory buffers are free and under-utilized in this power mode. Aspects of the present disclosure can use these unused TX memory buffers to temporarily store the CSI values so that the power saving mode of the SoC or application processor is not disturbed. Depending on an application latency and decision boundary, the bulk of CSI data is transferred to host memory at once for further operations by the SoC or application processor. In addition, aspects of the present disclosure can take advantage of the TX FIFO buffers during a normal operation if a transmit activity is below a certain defined threshold to improve central processing unit (CPU) utilization and interface utilization. In order to use TX FIFO buffers for CSI values, aspects of the present disclosure can use dynamic memory configuration and reallocation whenever the SoC or application processor goes to a lower power mode or the expected TX activity is less than a threshold. Whenever the SoC or application processor comes out of the lower power mode or has some packets to be transmitted, aspects of the present disclosure reconfigure and reallocate the memory as per the requirement of WLAN chipset operation. Aspects of the present disclosure can reduce the device's overall power consumption to enable always "ON" Wi-Fi CSI applications. Aspects of the present disclosure can also be used in other radio technologies than WLAN. For example, the embodiments described herein can be used in 5G technologies, as well as other cellular technologies in which CSI data is measured.

Aspects of the present disclosure can be used for offloading the pre-processing of CSI data. The offloading can provide supporting functions to the CSI-based application. For example, the offloaded pre-processing of the CSI data can process the CSI data to obtain CSI metrics, statistics, and FFT data. The pre-processing can including filtering, normalizing, or performing other operations to help the CSI-based applications make decisions on the CSI data. The pre-processing can also help reduce the amount of CSI data that is sent across the interface to the SoC or application processor from the WLAN chipset. The WLAN chipset can send raw CSI data, CSI metrics, or the like. In another embodiment, a decision engine on the WLAN chipset can filter and discard CSI data that is not helpful to the CSI-based application. For example, the decision engine can determine that CSI data being collected is noise and decide not to send that particular CSI data. The decision engine can make this determination using statistics, filtering, pre-processing, or filtering the CSI data.

FIG. 1A is a block diagram of a wireless device 100 with a System on Chip (SoC) 102 and a WLAN chipset 104 for dynamic memory allocation, according to at least one embodiment. The SoC 102 is coupled to a WLAN chipset 104 via an interface 106. The interface 106 can be a Secure Digital Input Output (SDIO) interface, PCIe interface, or other serial or parallel interfaces. The SoC 102 is an integrated circuit (IC) that integrates various components, such as a processing device 108 (e.g., a central processing unit (CPU)), a memory device 110 (random access memory and/or storage), input/output ports. The SoC 102 can include additional components, such as graphics processing unit (GPU), digital signal processing (DSP) circuits, digital circuits, analog circuits, mixed-signal circuits. In another embodiment, the SoC 102 is an application processor. The SoC 102 can integrate a microcontroller, microprocessor, or perhaps several processor cores with peripherals like a GPU, WLAN, and cellular network radio modems, and/or one or more co-processors. As illustrated in FIG. 1A, the SoC 102 couples to the WLAN chipset 104 as a peripheral over the interface 106. The WLAN chipset 104 is one or more integrated circuits that allow a device to communicate with another wireless device. The WLAN chipset 104 is coupled to one or more antennas 112. Alternatively, other types of wireless chipsets can be used. The WLAN chipset 104 can include various components, such as a processing device 103 (e.g., a baseband processor), transmit (TX) memory buffers 114, a WLAN transmitter 105, a WLAN receiver 107, radio frequency front-end (RFFE) circuitry, or the like. For example, the processing device 103 can include a baseband channel estimator 116 that can estimate the CSI values (and/or the RSSI) of a wireless channel 101. The WLAN chipset 104 communicates with the SoC 102 through the interface 106 using interface protocols (e.g., SDIO, PCIe, or the like). The CSI values are sent from the WLAN chipset 104 through interface 106 and saved on the memory device 110 of the SoC 102 for further processing. In at least one embodiment, the WLAN chipset 104 includes a network processor, and the network processor can perform operations in connection with the dynamic memory allocation described herein. In another embodiment, the WLAN chipset 104 includes a network processor and a co-processor. The network processor and/or co-processor can perform operations in connection with the dynamic memory allocation described herein. In another embodiment, the WLAN chipset 104 is coupled to a hardware accelerator circuit. The hardware accelerator circuit can perform operations in connection with the dynamic memory allocation described herein.

Typically, commercial WLAN chipsets do not have dedicated memory for saving the CSI values. A driver of the WLAN chipset receives the CSI values in real-time. So, to receive the CSI values, an SoC or application processor coupled to these WLAN chipsets would need to be active. Similarly, the memory interfaces between the WLAN chipset would need to be active to receive the real-time CSI values being measured. In contrast, the SoC 102 and the WLAN chipset 104 can use a memory allocation engine 118 to dynamically reallocate the TX memory buffers 114 to temporarily store the CSI values when in a lower power mode (e.g., power save mode) of the SoC 102. In the lower power mode, the SoC 102 is operating in a second power range that is lower than a first power range in which the SoC receives the CSI values. The TX memory buffers 114 can be first-in-first-out (FIFO) memory buffers populated by the driver with intended transmit packets. However, when the SoC 102 is in power save mode, there will not be any transmit activity from the SoC 102, so the TX memory buffers 114 are free and under-utilized. The memory allocation engine 118 can configure the WLAN chipset 104 to temporarily store the CSI values in a portion of the TX memory buffers 114 such that the lower power mode of the SoC 102 is not disturbed. The portion of the TX memory buffers 114 can be an unused portion and can be programmed by the memory allocation engine 118 based on various parameter values specified by an application executing on the SoC 102. The memory allocation engine 118 can define a first parameter value that specifies a transfer interval and a second parameter value that specifies an amount of memory to reserve in the TX memory buffers 114 for CSI values measured during the transfer interval. The baseband channel estimator 116 can determine the CSI values and store the CSI values in the TX memory buffers 114. The WLAN chipset 104 can send the CSI values to the SoC 102 at the end of the transfer interval. Depending on the application latency and decision boundary of a transfer interval, the bulk of CSI data is transferred to the memory device 110 (e.g., host memory) at once at the end of the transfer interval. In addition, as described herein, the memory allocation engine 118 can take advantage of unused we can also take advantage of these Tx FIFO buffers during the normal operation if the transmit activity is below a certain defined threshold to improve the CPU and interface utilization.

In at least one embodiment, to use the TX memory buffers 114 for CSI values, dynamic memory configuration and reallocation need to happen whenever the SoC 102 goes to a lower power mode (e.g., a sleep mode) or the expected TX activity is less than a threshold value. Whenever the SoC 102 comes out of the lower power mode or has some packets to be transmitted, the TX memory buffers 114 are reconfigured and allocated as per the requirement of WLAN operation of the WLAN chipset 104. The memory allocation engine 118 can reconfigure the TX memory buffers 114 to temporarily store CSI values based on various memory requirements of the CSI-based application. Some of the factors can include the amount of time for which the CSI data is needed to be retained on the WLAN chipset 104, the size of the CSI data and the number of links in the CSI data, a percentage of the TX memory buffers 114 that is still needed for TX packets for normal functionality or when transitioning to a normal mode in which the TX memory buffers 114 are being reconfigured back to normal allocation levels.

In at least one embodiment, the wireless device 100 includes a first integrated circuit (102) with a first processing device (108) and a first memory device (110) and a second integrated circuit (104) with a second processing device (103), a second memory device (114), a WLAN transmitter 105, and a WLAN receiver 107. The WLAN transmitter 105 sends the first data to a second wireless device (not illustrated in FIG. 1A) over the wireless channel 101 and the WLAN receiver 107 receives second data from the second wireless device over the wireless channel 101. The second processing device generates CSI values that represent channel properties of the wireless channel 101. The second memory device includes a set of memory buffers that store the first data before sending it to the second wireless device and store the CSI values when reconfigured by the memory allocation engine 118. In at least one embodiment, the first processing device (108) or the memory allocation engine 118 periodically receives, from the second processing device, a first set of the CSI values at a first periodicity while the first integrated circuit is operating in a first power mode. At a first time, the first processing device (108) or the memory allocation engine 118 determines that i) the first integrated circuit is operating in a second power mode that is lower than the first power mode or ii) the amount of the first data to be sent to the second wireless device is less than a threshold value. The threshold value can represent a minimum amount of data traffic that indicates a portion of the set of memory buffers is unused and can store CSI values. The first processing device (108) or the memory allocation engine 118 causes the second processing device (103) to store a second set of the CSI values in the set of memory buffers (114) and periodically send the second set of the CSI values to the first processing device (108) at a second periodicity. The second periodicity is less than the first periodicity. The first processing device (108) or the memory allocation engine 118 periodically receives, from the second processing device, the second set of the CSI values at the second periodicity and stores the second set of CSI values in the first memory device (110). The CSI values can be time-series CSI measurement values. The CSI values can be filtered CSI values. The CSI values can be pre-processed CSI values.

In a further embodiment, at a second time after the first time, the first processing device (108) or the memory allocation engine 118 determines that iii) the first integrated circuit is operating in the first power mode or iv) the amount of the first data to be sent to the second wireless device is equal to or greater than the threshold value. The first processing device (108) or the memory allocation engine 118 causes the second processing device to periodically send a third set of the CSI values to the first processing device at the first periodicity in the first power mode. The first processing device (108) or the memory allocation engine 118 periodically receives, from the second processing device, the third set of the CSI values at the first periodicity.

In another embodiment, the first processing device (108) or the memory allocation engine 118 sends third data to the second processing device. The third data includes a first parameter value that specifies a transfer interval corresponding to the second periodicity and a second parameter value that specifies an amount of memory to reserve in the set of memory buffers for the second set of CSI values. The second processing device sends the second set of the CSI values stored in the set of memory buffers at the end of the transfer interval.

In another embodiment, the first processing device (108) or the memory allocation engine 118, at a third time after the first time, determines that v) the first integrated circuit is operating in the first power mode and vi) the amount of the first data to be sent to the second wireless device is less than the threshold value, the threshold value representing the minimum amount of data traffic. The first processing device (108) or the memory allocation engine 118 causes the second processing device to store a third set of the CSI values in the set of memory buffers and periodically send the third set of the CSI values to the first processing device at the second periodicity.

Figure 1B:
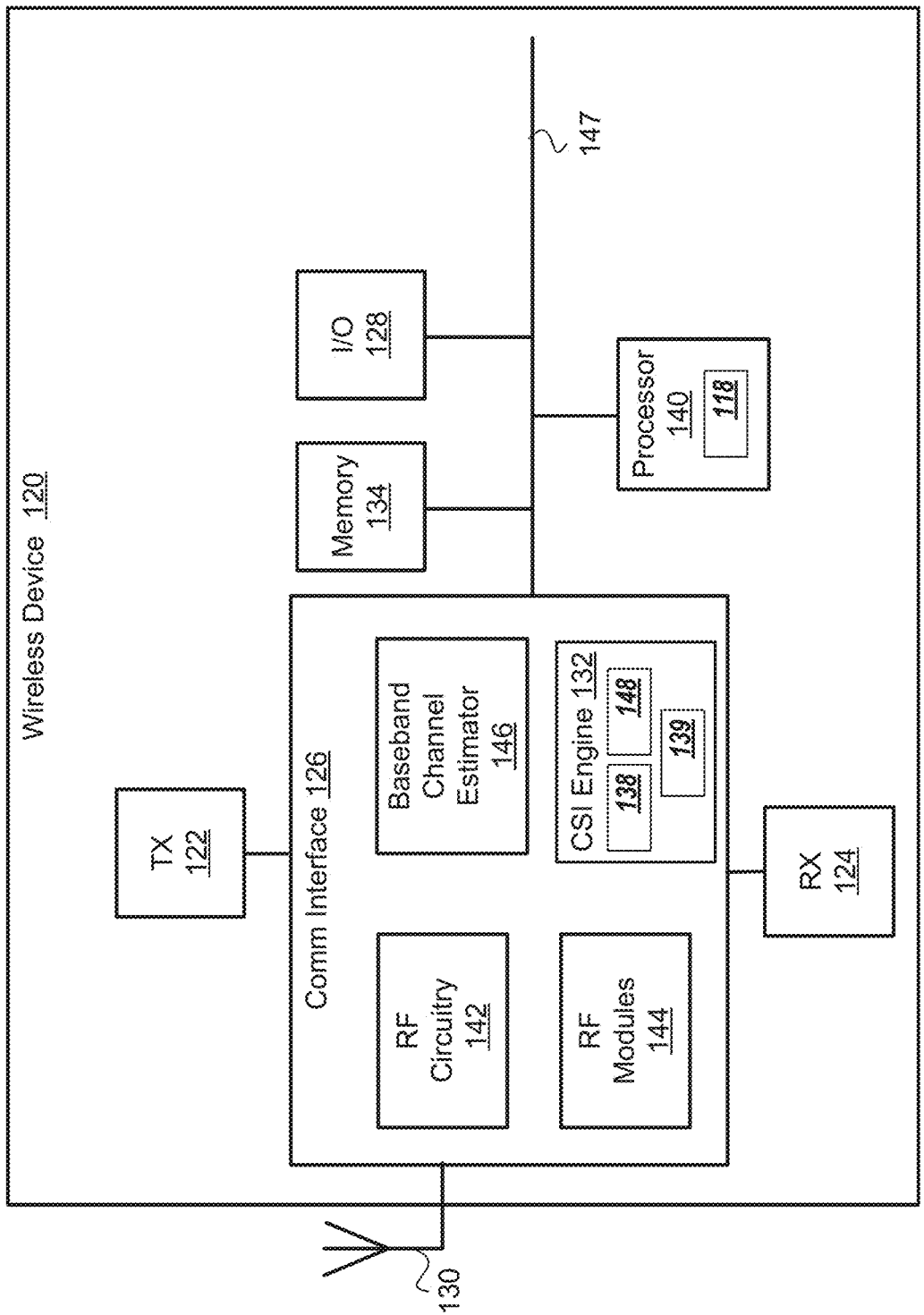
FIG. 1B illustrates a wireless device adapted to detect and transmit channel state information (CSI) and/or received signal strength indicator (RSSI) data useable to perform CSI-based motion and presence detection, according to at least one embodiment.

FIG. 1B illustrates a wireless device 120 adapted to detect and transmit channel state information (CSI) or received signal strength indicator (RSSI) data useable to perform CSI-based motion and presence detection, according to at least one embodiment. Accordingly, the wireless device 120 may represent a wireless detector or an access point device in different embodiments. The wireless device 120 may include, but not be limited to, a transmitter (TX) 122 (e.g., a WLAN transmitter), a receiver (RX) 124 (e.g., a WLAN receiver), a communications interface 126, one or more antenna 130, a memory device 134, one or more input/output (I/O) devices 128, and a processor 140. The memory allocation engine 118 can be executed on the processor 140 and can communicate with a memory allocation agent 138 at the communication interface 126. These components may all be coupled to a communications bus 147. The memory device 134 may include storage in which to store the supervised ML model 158, e.g., a support vector machine (SVM) or a neural network (NN) model, the WLAN sensing mobile application 178, or other software components that can perform some of the operations described herein.

In another embodiment, a CSI engine 132 can be executed on the communication interface 126 and includes the memory allocation agent 138 and a CSI metric calculator 148 and a CSI decision engine 139. The CSI metric calculator 148 can calculate CSI metrics of the CSI data. The CSI metrics can be sent to the memory allocation engine 118. The CSI decision engine 139 can process the CSI data and make one or more decisions about the CSI data. The CSI decision engine 139 can provide supporting functions of the CSI-based applications. The CSI decision engine 139 can offload some of the functionality of the CSI-based applications. For example, the CSI decision engine 139 can use the CSI metric calculator 148 to characterize the CSI data to determine whether to filter, pre-process, discard any CSI data before being stored or transmitted to the memory allocation engine 118 (of an SoC or application processor). The CSI decision engine 139 can make decisions based on CSI statistics, FFT data corresponding to the CSI data, or the like. The CSI decision engine 139 can filter, normalize, or perform other operations that help the CSI-based application make decisions on the CSI data. In one embodiment, the CSI decision engine 139 filter and discard CSI data that is not helpful to the CSI-based application. For example, the decision engine can determine that CSI data being collected is noise and decide not to send that particular CSI data. The CSI decision engine 139 can make this determination using statistics, filtering, pre-processing, or filtering the CSI data. The pre-processing by the CSI engine (e.g., 138, 148, or 139) can also help reduce the amount of CSI data that is sent across the interface to the SoC or application processor from the communication interface 126 (e.g., WLAN chipset). The communication interface 126 (e.g., WLAN chipset) can send raw CSI data, CSI metrics, or the like.

In one embodiment, the receiver 124 receives the first data indicative of channel properties of a first communication link between the wireless device 120 and a wireless transmitter 122 in the access point device, both located in a building. In one embodiment, the processor 140 may be configured to direct the TX 122 to transmit the first data, including the channel properties, to a remote computing device (e.g., the computing device 150) over the network 115 for supervised ML processing. The processor 140 may further be configured to perform pre-processing of the first data and to classify the pre-processed first data as detecting either a stationary object (e.g., which may be known already to be stationary) or detecting a moving object such as a human, as described herein. In various embodiments, the I/O devices 218 may include an input device such as a microphone and an output device such as a speaker.

The antennas (such as the antenna 130) described herein within various devices may be used for Long Term Evolution (LTE) frequency bands, third-generation (3G) frequency bands, Wi-Fi®, and Bluetooth® frequency bands or other WLAN frequency bands, including Zigbee®, Z-wave™ or the like, wide area network (WAN) frequency bands, global navigation satellite system (GNSS) frequency bands such as global positioning system (GPS) frequency bands, or the like.

As illustrated in FIG. 1B, the communications interface 126 may further include RF circuitry 142, a set of RF modules 144, and a baseband channel estimator 146. In one embodiment, one of the RF modules 144 may include a WiFi® PHY at which the RF energy of received RF signals may be measured for purposes of RSSI. In addition, the baseband channel estimator 146 may be coupled to the antenna 130, the TX 122, and the RX 124, and be adapted to estimate the CSI (or the RSSI) for each channel. As discussed, the CSI includes a detailed channel impulse response (e.g., containing channel properties) with both amplitude and phase information across all the OFDM subcarriers and is updated (at the maximum rate) every OFDM symbol. This provides more information about the environment under surveillance, and thus provides excellent detection capability when applying a supervised ML model to CSI data.

The wireless device 120 may, in various embodiments, continuously upload RSSI or CSI data to the computing device 150 (FIG. 1) for use in device placement processing and/or supervised ML model processing, or may buffer the RSSI or CSI data in the memory 134 (or other computer storage) and then periodically upload the RSSI or CSI data at a predetermined time interval. This data may allow the computing device 150 to perform updates to the training of the supervised ML model 158. In one embodiment, the wireless device 120 (or a co-located computing system) is adapted to include sufficient memory, storage, and processor power to be able to directly perform pre-processing and classification with the supervised ML model 158 discussed herein.

In some embodiments, the wireless device 120 (or co-located computing system) may contain sufficient processing power to perform updates to the training of the supervised ML model 158, and thus may work independently of access to cloud-based resources. These updates may be made using newly received data containing channel properties that confirm or fail to confirm the accuracy of the pre-trained classifiers 162, which are trained as a part of the supervised ML model 158.

Figure 1C:
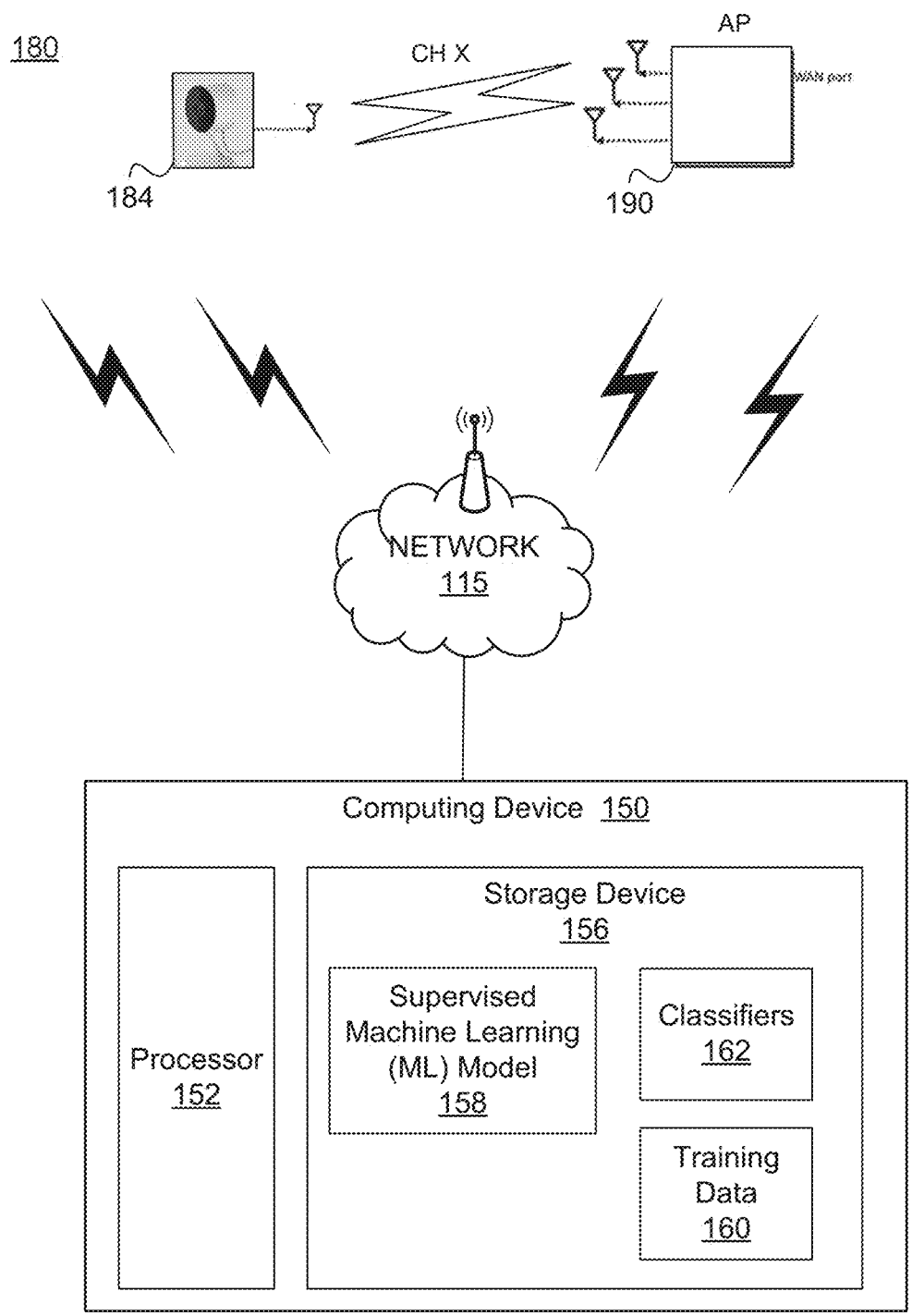
FIG. 1C is a block diagram of a system for CSI-based motion and presence detection of a human using wireless signals in a WLAN, according to at least one embodiment.

FIG. 1C is a block diagram of a system 180 for CSI-based motion and presence detection of a human using wireless signals in a WLAN, according to at least one embodiment. The system 180 may include a wireless detector 184, at least one access point device 190 that includes a transmitter of wireless signals, a network 115 (e.g., WLAN, a wide area network (WAN), or cellular), and a computing device 150. The wireless detector 184, which may be a WLAN receiver, may be located in a room (or other space) in or near a building in order to detect presence associated with the room (or other space). The access point device 190, which may be a WLAN transmitter, may transmit wirelessly over multiple channels, at least one of which is received by a receiver within the wireless detector 184. The access point device 190 may be in the same or a different room than the wireless detector 184.

In various embodiments, the wireless detector 184 may receive first data indicative of channel properties of a communication link between the wireless detector 184 and the access point device 190. The wireless detector 184 (or some remote device to which the first data is transmitted) may classify the first data to determine whether a human presence has been detected. This classification, as mentioned, may be performed using a trained, supervised machine learning (ML) model, such as an SVM model, a NN model, or another trained ML model.

The computing device 150, located in the cloud across the network 115, may perform the initial training of the supervised ML model 158 for detecting the presence and motion of a human using wireless signals in a wireless local area network. The computing device 150 may include, for example, a processor 152 and storage device 156. The storage device 156, which may be understood to include computer memory and/or storage, may include a supervised ML model 158 (e.g., code for execution of the supervised ML model), training data 160, and pre-trained classifiers 162, which may be used in performing detection and location identification of persons within buildings. The pre-trained classifiers 162 may be hundreds or even thousands of classifiers of types of objects expected to be found in rooms of the building, such as furniture, built-in buildings, plants, indoor trees, moving items (both animate and inanimate, including pets), and different sizes and shapes of humans and those humans moving in different ways. For example, in one embodiment, a classifier for a human may be trained to recognize the human movement as distinguished from the movement of pets or curtains.

The training data 160 may later be updated over time as people come and go through the room, and the data captured at the wireless detector 184 (and at other wireless detectors and receivers) within the building may include additional data, including channel properties, captured during periods of time in which the room may change, and particularly with reference to detecting people moving within the room. This updated training data may then be used to train the pre-trained classifiers 162 to improve presence detection. Thus, an updated supervised ML model 158 may be transmitted periodically by the computing device 150 to the wireless detector 184 (or to a remote second device) used to perform classification to determine the human presence in the future.

Employing trained ML models to perform presence detection may be performed on different types of channel property data, including Received Signal Strength Indicator (RSSI) data, Channel State Information (CSI), or a combination of both. In addition, additional sources of signal characteristics, power, or channel properties, or other channel information may also be employed. Therefore, RSSI and CSI are but a listing of understood and available forms of channel properties.

Accordingly, in one embodiment, the wireless detector 184 may receive and transmit RSSI, which is a parameter (e.g., channel properties) that has a value of zero ("0") to an RSSI maximum value (referred to as "RSSI Max"), and is indicative of the signal strength of a wireless signal associated with a wireless network. Accordingly, RSSI is a measurement value of power present in received wireless signals and contains a single value per packet. For example, RSSI can be measured as the power level of a radio frequency that a client device receives from an access point, such as a wireless router. In another implementation, RSSI may be a measurement of the energy observed at the antenna by a wireless PHY of the receiver used to receive a current PPDU of the receiver. In one implementation of a home WLAN (e.g., using the WiFi® technology), the wireless detector 184 may generate the RSSI based on a data frame received or a beacon from an AP node. The RSSI may fluctuate when the environment changes. Such changes can be caused by many factors, such as moving a transmitter or receiver, moving objects nearby the AP or client, a change in ambient noise level, temperature swings, or other such factors that cause fluctuations in RSSI.

In another embodiment or implementation, the wireless detector 184 may measure and transmit CSI, which is data that includes channel properties of a communication link between a transmitter and a receiver. For example, a receiver within the wireless detector 184 may retrieve the CSI from a baseband channel estimator with which to perform presence detection. The receiver may adjust the rate of sampling channel properties by the baseband channel estimator. The CSI may include a detailed channel impulse response with both amplitude and phase information across all the OFDM subcarriers and be updated (at the maximum rate) every OFDM symbol. This may provide more information about the environment under surveillance, and thus may improve detection capability when applying a trained ML model, as discussed herein, to CSI data or CSI-liked data.

As described above, CSI-based motion detectors work based on disruption to the channel state information and multipath effects of WLAN transmission between APs, smart speakers, streaming devices, or the like. These CSI-based motion detectors rely on the CSI data to be continuously exchanged between devices, presenting some challenges when devices transition to lower power states. The memory allocation engine 118 can reconfigure the TX memory buffers to temporality store CSI packets as illustrated and described below with respect to FIG. 2.

Figure 2:
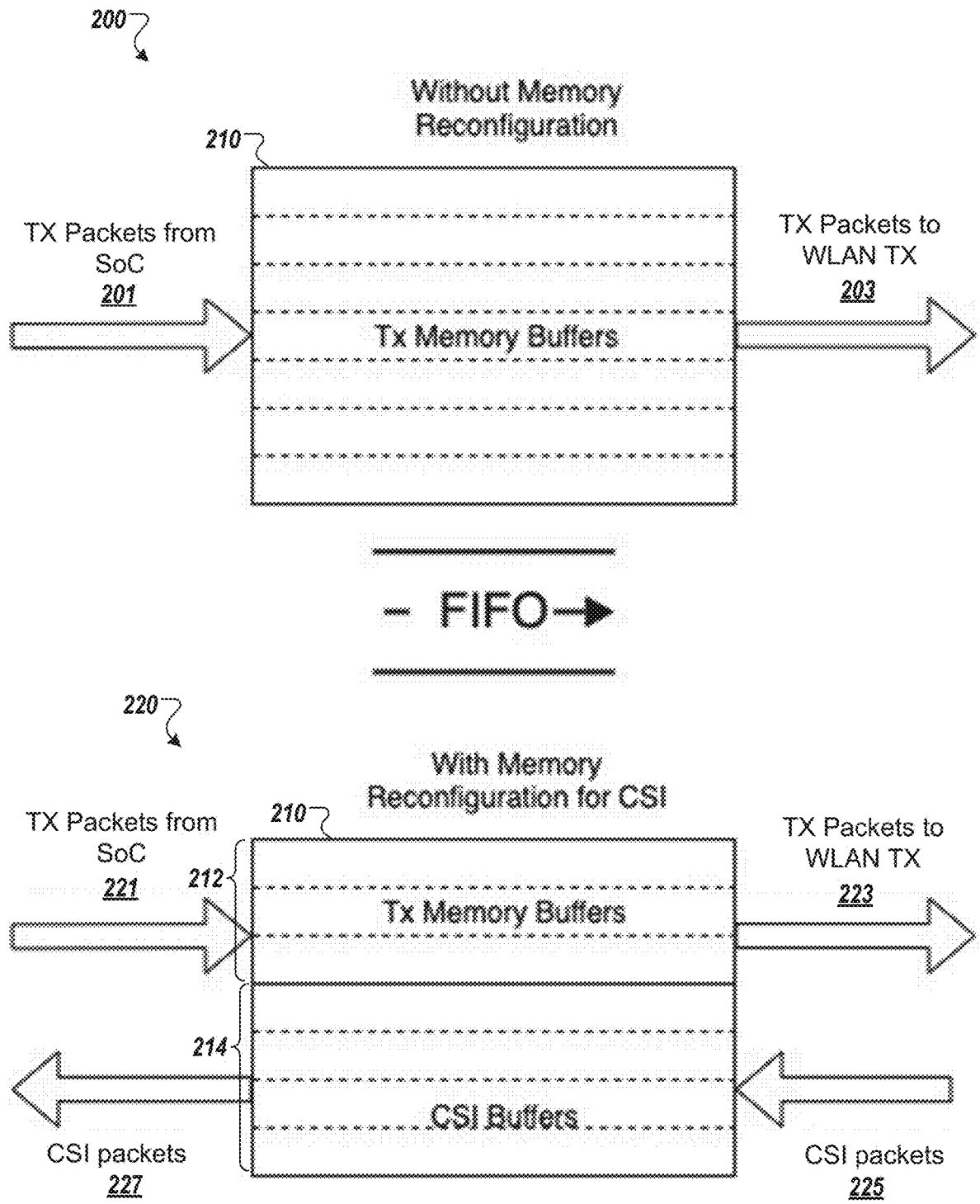
FIG. 2 illustrates two modes of transmit (TX) memory buffers for memory reconfiguration to temporarily store CSI packets for a CSI-based in a WLAN, according to at least one embodiment.

FIG. 2 illustrates two modes of transmit (TX) memory buffers 210 for memory reconfiguration to temporarily store CSI packets for a CSI-based in a WLAN, according to at least one embodiment. In a first mode 200, the TX memory buffers 210 receive input 201 from the SoC. The input 201 can include the TX packets to be transmitted by the WLAN TX. The TX memory buffers 210 send output 203 to the WLAN TX. The output 203 can include the TX packets to be transmitted by the WLAN TX. In the first mode 200, there is no memory reconfiguration of the TX memory buffers 210, so all TX memory buffers 210 are available to store TX packets.

In a second mode 220, the TX memory buffers 210 can continue to receive input 221 from the SoC, the input 201 including TX packets to be transmitted by the WLAN TX. The input 201 in the second mode 220 can be less than input 201 in the first mode 200. In some cases, there is no input 221 received from the SoC in the second mode 220. The TX memory buffers 210 send output 223 to the WLAN TX. The output 223 can include the TX packets to be transmitted by the WLAN TX. In the second mode 220, there is memory reconfiguration of the TX memory buffers 210 in which a first portion 212 of the TX memory buffers 210 are available for storing TX packets and a second portion 214 of the TX memory buffers 210 are available for storing CSI packets. In particular, the second portion 214 can be used to stored CSI packets 225 received from the processing device of the WLAN chipset (e.g., baseband channel estimator). The WLAN chipset can send the CSI packets 227 to the SoC from the second portion 214 of the TX memory buffers 210, such as at the end of a transfer interval specified in the memory reconfiguration parameters.

In at least one embodiment, the TX memory buffers 210 are configured in the memory reconfiguration for CSI data using one or more parameter values. For example, a first parameter value can be stored in a first register of the WLAN chipset to program a transfer interval, and a second value can be stored in a second register of the WLAN chipset to program an amount of memory to reserve in the TX memory buffers 210 for CSI values. That first parameter value can specify when the CSI packets 227 are sent or retrieved from the TX memory buffers 210, and the second parameter value can specify the size of the second portion 214. When the SoC returns to normal operation without memory reconfiguration, the first parameter value and the second parameter value can return to some default values that do not reserve the second portion 214.

In at least one embodiment, a first integrated circuit sends first data to a WLAN chipset having the TX memory buffers 210. The WLAN chipset stores the first data in the TX memory buffers 210 before transmitting. The first integrated circuit receives SCI values from the WLAN chipset and stores the first CSI values in a memory device coupled to or integrated within the first integrated circuit. The first integrated circuit sends second data to the WLAN chipset that causes the WLAN chipset to store second CSI values in the TX memory buffers 210 for a specified interval. The first integrated circuit receives the second CSI values after the specified interval has elapsed and stores the second CSI values in the memory device coupled to or integrated within the first integrated circuit.

In a further embodiment, the first integrated circuit sends the second data in response to a determination that the first integrated circuit is operating in a second power mode lower than a first power mode in which the first integrated circuit receives the first CSI values. In another embodiment, the first integrated circuit determines that the first integrated circuit operates in the first power mode after operating in the second power mode. As a result, the first integrated circuit sends third data to the WLAN chipset that causes the WLAN chipset to send third CSI values without being stored in the TX memory buffers 210 for the specified interval. The first integrated circuit receives the third CSI values from the WLAN chipset and stores the third CSI values in the memory device.

In another embodiment, the first integrated circuit determines that the first integrated circuit operates in the first power mode after operating in the second power mode. The first integrated circuit determines that the amount of the first data to be sent to the second wireless device is less than a threshold value, the threshold value representing a minimum amount of data traffic. The first integrated circuit sends third data to the WLAN chipset that causes the WLAN chipset to store third CSI values in the TX memory buffers 210 for a second specified interval. The first integrated circuit receives the third CSI values after the second specified interval from the WLAN chipset and stores the third CSI values in the memory device.

In another embodiment, the first integrated circuit determines that an amount of the first data to be sent to the second wireless device is equal to or greater than a threshold value, the threshold value representing a minimum amount of data traffic. The first integrated circuit sends third data to the WLAN chipset that causes the WLAN chipset to send third CSI values without being stored in the TX memory buffers 210 for the specified interval. The first integrated circuit receives the third CSI values from the WLAN chipset and stores the third CSI values in the memory device.

In another embodiment, the first integrated circuit determines that the amount of the first data to be sent to the second wireless device is less than the threshold value and sends fourth data to the WLAN chipset that causes the WLAN chipset to store fourth CSI values in the TX memory buffers 210 for a second specified interval. The first integrated circuit receives the fourth CSI values after the second specified interval from the WLAN chipset and stores the fourth CSI values in the memory device.

In at least one embodiment, the first integrated circuit is an SoC. In another embodiment, the first integrated circuit is an application processor. In at least one embodiment, the SoC includes a memory device to store CSI values. The capacity of the memory device is greater than the capacity of the TX memory buffers 210. In another embodiment, the TX memory buffers 210 are FIFO memory buffers. A driver of the WLAN chipset stores at least a portion of the first data in the transmit FIFO memory buffers before sending the first data to the second wireless device. In at least one embodiment, the drive stores at least a portion of the first data in the transmit FIFO memory buffers, while at least some CSI values are concurrently stored in a reserved portion of the transmit FIFO memory buffers.

Figure 3:
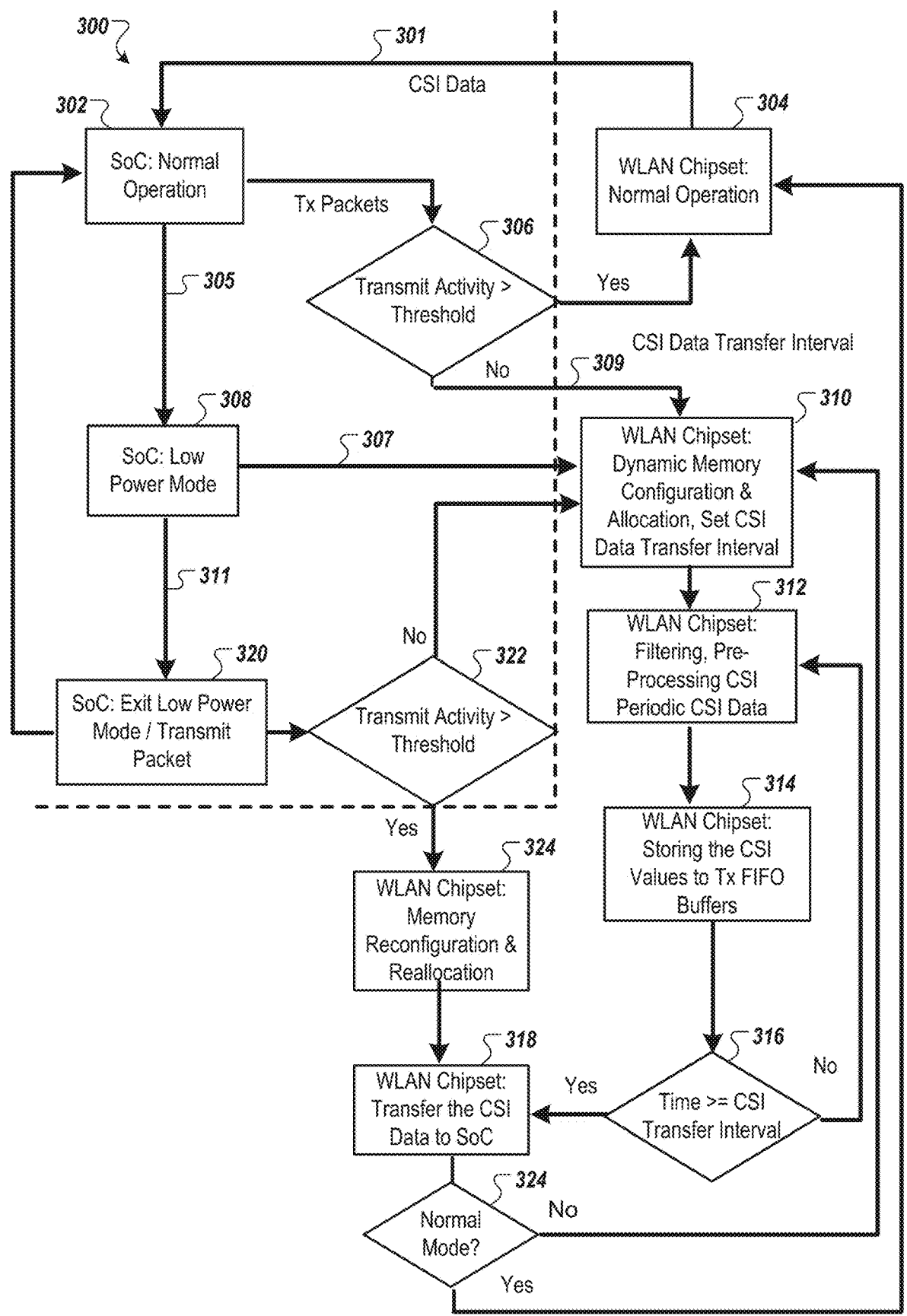
FIG. 3 is a flow diagram of a method of allocating a portion of TX memory buffers to temporarily store CSI packets, according to at least one embodiment.

FIG. 3 is a flow diagram of a method 300 of allocating a portion of TX memory buffers to temporarily store CSI packets, according to at least one embodiment. The method 300 may be performed by processing logic that may comprise hardware (e.g., circuitry, dedicated logic, programmable logic, microcode, etc.), software (such as instructions running on the processor), firmware, or a combination thereof. In one embodiment, the SoC 102 or the processing device 108 of SoC 102 of the wireless device 100 performs the method 300. In one embodiment, the processor 140 of the wireless device 120 performs the method 300. In one embodiment, a processor of the wireless detector 184 performs the method 300. In another embodiment, some of the operations of method 300 are performed by a first integrated circuit (e.g., SoC 102), and a second integrated circuit performs other operations of method 300 (e.g., WLAN chipset 104). Alternatively, other components of a disclosed device may perform some or all of the operations of the method 300.

With further reference to FIG. 3, the method 300 may begin with the processing logic of the SoC operating with normal operation in a first power mode (block 302) and the processing logic of the WLAN chipset operating with normal operation (block 304). In the first power mode, the SoC receives CSI data 301 from the WLAN chipset. The WLAN chipset can send the CSI data 301 with a first periodicity. The processing logic of the SoC can send TX packets to the WLAN chipset and determine whether an amount of TX packets, referred to as transmit activity, is greater than a threshold value (block 306). If so, the processing logic of the SoC continues to operate in the first power mode, and the WLAN chipset continues to send CSI data 301 to the SoC during normal operations.

In at least one embodiment, when the SoC transitions 305 to a second power mode that is lower than the first power mode, the processing logic of the SoC can send data 307 to the WLAN chipset that cause the WLAN chipset to operate in a dynamic memory configuration and allocation state in which a CSI data transfer interval is set (block 310) for temporarily storing CSI data in the set of memory buffers during the CSI data transfer interval and sending the CSI data at the end of the CSI data transfer interval. In one embodiment, the second data includes a first parameter value that specifies a transfer interval corresponding to a second periodicity less than the first periodicity of the first power mode. The second data can include a second parameter value that specifies an amount of memory to reserve in the set of memory buffers for temporarily storing CSI values. In another embodiment, the second data can include an indication that the SoC has transitioned to the second power mode, and the WLAN chipset can use the indication to set the CSI data transfer interval based on previously stored configuration parameters. In at least one embodiment, the processing logic of the WLAN chipset can filter and/or pre-process CSI data to obtained filtered and/or pre-processed CSI data to store in the set of memory buffers (block 314). The filtered and/or pre-processed CSI data can be periodic data. That is, the WLAN chipset can measure a first amount of CSI data, and the filtering and/or pre-processing can produce a second amount of CSI data that is less than the first amount. The processing logic of the WLAN chipset can determine if an amount of time is greater than or equal to a CSI transfer interval (block 316). That is, the processing logic can determine if the end of the transfer interval is reached at block 316. If so, the processing logic of the WLAN chipset sends the CSI data to the SoC at the end of the interval at block 318). If not, the processing logic can return to block 312 or block 310 and repeat until the end of the CSI transfer interval is reached at block 316.

In at least one embodiment, when the SoC is still in the first power mode, the processing logic of the SoC can determine that the transmit activity is less than or equal to the threshold value at block 306 and can send data 309 to the WLAN chipset that causes the WLAN chipset to continue in the dynamic memory configuration and allocation state at block 310. For example, in one embodiment, the data 309 includes a first parameter value that specifies a transfer interval corresponding to a second periodicity less than the first periodicity of the first power mode. In addition, data 309 can include a second parameter value that specifies an amount of memory to reserve in the set of memory buffers for temporarily storing CSI values. In another embodiment, data 309 can include an indication that the TX packets 303 are less than the threshold value corresponding to the minimum amount of data traffic. The WLAN chipset can use the indication to set the CSI data transfer interval based on previously stored configuration parameters.

In at least one embodiment, the SoC can determine that it exits the second power mode back to the first power mode (block 320), such as after a specified period of time or additional TX packets need to be sent. When the SoC transitions 311 back to the first power mode, the processing logic of the SoC can send additional TX packets to the WLAN chipset and determine if the transmit activity is greater than the threshold (block 322). If the transmit activity is less than or equal to the threshold value at block 322, the SoC causes the WLAN chipset to continue to operate in the dynamic memory configuration and allocation state with the CSI data transfer interval for sending CSI data at block 310. If the transmit activity is greater than the threshold value at block 322, the SoC causes the WLAN chipset to transition to operate in a memory reconfiguration and reallocation state (block 324). The SoC can send an indication or data to the WLAN chipset to indicate that it exits the second power mode back to the first power mode. The processing logic of the WLAN chipset can transfer the CSI data stored in the set of memory buffers to the SoC (block 318). The processing logic of the WLAN chipset can determine whether the SoC is operating in the first power mode (normal mode) or the second power mode (block 324). If the SoC is operating in the first power mode (normal mode), the processing logic of the WLAN chipset returns to block 304. If the SoC is operating in the second power mode, the processing logic of the WLAN chipset returns to block 310.

Figure 4:
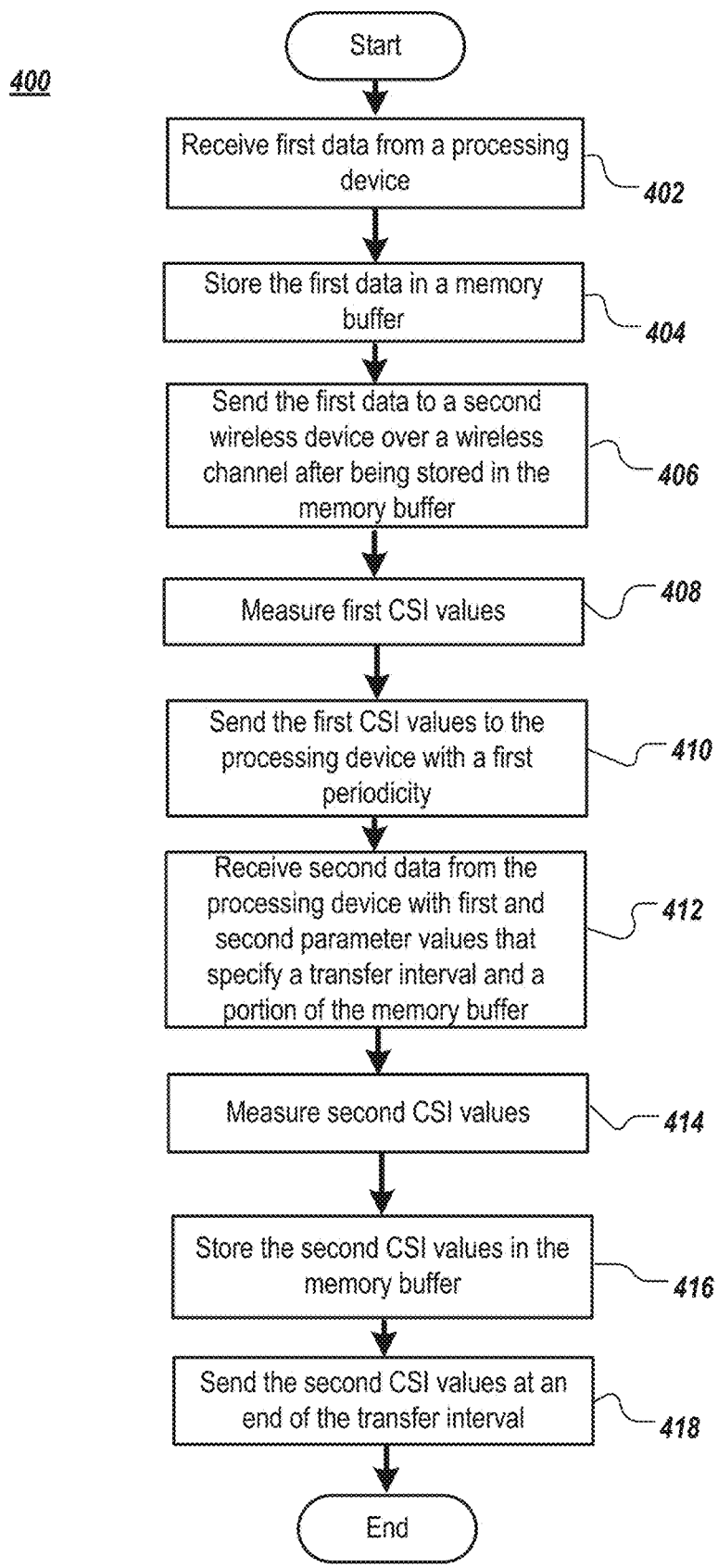
FIG. 4 is a flow diagram of a method for dynamic memory allocation for device power savings, according to at least one embodiment.

FIG. 4 is a flow diagram of a method 400 for dynamic memory allocation for device power savings, according to at least one embodiment. The method 400 may be performed by processing logic that may comprise hardware (e.g., circuitry, dedicated logic, programmable logic, microcode, etc.), software (such as instructions running on the processor), firmware, or a combination thereof. In one embodiment, the SoC 102 or the processing device 108 of SoC 102 of the wireless device 100 performs the method 400. In one embodiment, the processor 140 of the wireless device 120 performs the method 400. In one embodiment, a processor of the wireless detector 184 performs the method 400. Alternatively, other components of a disclosed device may perform some or all of the operations of the method 400.

With further reference to FIG. 4, the method 400 may begin with the processing logic receiving first data from a processing device (block 402). The processing logic stores the first data in a memory buffer (block 404). The processing logic sends the first data to a second wireless device over a wireless channel after being stored in the memory buffer (block 404). The processing logic measures first CSI values representing channel properties of the wireless channel (block 408). The processing logic sends the first CSI values to the processing device with a first periodicity (block 410). The processing logic receives second data from the processing device (block 412). The second data includes a first parameter value that specifies a transfer interval and a second parameter value that specifies an amount of memory to reserve in the memory buffer for second CSI values measured during the transfer interval. The processing logic measures the second CSI values (block 414) and stores the second CSI values in the memory buffer (block 416). In another embodiment, the second data includes an indication that the processing device is operating in a second power mode that is less than a first power mode in which the processing device receives the first CSI values. In another embodiment, the second data includes an indication that the amount of the first data to be sent to the second wireless device is less than a threshold value. The threshold value represents a minimum amount of data traffic. The processing logic sends the second CSI values to the processing device at the end of the transfer interval (block 418), and the method 400 ends.

In a further embodiment, the processing logic receives, from the processing device, an indication that subsequent CSI values be sent with the first periodicity. The processing logic measures third CSI values and sends the third CSI values to the processing device with the first periodicity.

In a further embodiment, the processing logic filtering the second CSI values to obtain filtered CSI values. In this case, the second CSI values stored in the memory buffer are filtered CSI values. In another embodiment, the processing logic processes the second CSI values to obtain processed CSI values. In this case, the second CSI values stored in the memory buffer are processed CSI values.

In at least one embodiment, the processing logic can perform filtering and pre-processing, or both before storing the CSI values, such as illustrated and described below with respect to CSI data illustrated in FIGS. 5A-5F and 6A-6F.

The standard Institute for Electrical and Electronics Engineers (IEEE) 802.11n was established in 2007 to boost the range and throughput of WiFi® service. In IEEE 802.11n, multiple-in, multiple-out (MIMO) OFDM is used, and the physical layer presents a value to estimate the channel status in each subcarrier, e.g., the CSI for each subcarrier. The CSI may therefore be expressed as:

$$H = \begin{bmatrix} h_{11} & h_{12} & \ldots & h_{1N_r} \\ h_{21} & h_{22} & \vdots & h_{2N_r} \\ \vdots & \vdots & \vdots & \vdots \\ h_{N,1} & h_{N,2} & \vdots & h_{N_tN_r} \end{bmatrix} \quad (1)$$

where $$H(f_k) = |H(f_k)|e^{j\angle H(f_k)} \quad (2)$$

The term $H(f_k)$ represents the CSI value at the subcarrier level with frequency $f_k$. $|H(f_k)|$ denotes the amplitude and $\angle H(f_k)$ the phase in the subcarrier. The CSI describes how a signal propagates between the transmitter and the receiver device in both amplitude and phase. The CSI also reveals the combined effect of scattering, fading, and power decay with respect to the distance of the received signals.

In one example, a transmitter may be the multi-output transmitter, and the receiver may be the multi-input receiver. The transmitter may transmit in many directions, including a line of sight (LoS) path as well as paths that reflect off of objections, such as a wall. Signal propagation may also be disturbed by human motion, and different motion activity may return different characteristics in the CSI data. In this way, machine learning may be used to classify the presence of the human. Equation (1) may depict the CSI data within a static channel, e.g., within a communication link that includes no human movement. Equation (2) may detect the CSI data within a combination of a static channel and dynamic channel, where a portion of the CSI data indicates human movement.

$$H(f, t) = e^{-j2\pi\Delta ft} \sum_{k=1}^{N} a_k(f, t)e^{-j2\pi f\tau_k(t)} \quad (1)$$

$$H(f, t) = e^{-j2\pi\Delta ft} \left( H_s(f) + \sum_{k \in P_d} a_k(f, t)e^{-j\frac{2\pi d_k(t)}{\lambda}} \right) \quad (2)$$

where $H_s(f)$ in Equation (2) is the static channel component.

Given a complex-numbered CSI stream $h(k, t_n)$ for $k_{th}$ subcarrier index sampled at time $t_n$, the magnitude of $h(k, t_n)$ over time period T has N samples and can construct an $N_{sc} \times N$ matrix H.

$$H = \begin{bmatrix} |h(1, t_1)| & \ldots & |h(1, t_N)| \\ \vdots & \ddots & \vdots \\ |h(N_{sc}, t_1)| & \ldots & |h(N_{sc}, t_N)| \end{bmatrix} \quad (3)$$

The matrix, H, of Equation (3) may include the interpolated and filtered data spanning various data points over time for the $k_{th}$ subcarrier index.

The processing logic can execute an FFT on the pre-processed data to generate a data stream in the frequency domain, e.g., that contains frequency domain information of the pre-processed data. The fast FFT is a discrete Fourier transform algorithm that reduces the number of computations needed for N points from $2N^2$ to 2NlgN, where lg is the base-2 logarithm. In one embodiment, a one-dimensional FFT with $N_{fft}$ points may be applied to each row of the matrix of Equation (3) to result in the following Doppler spectrum matrix, $H_{freq}$, given as Equation (4).

$$H_{freq} = \begin{bmatrix} |\tilde{h}(1, f_0)| & \ldots & |\tilde{h}(1, f_{N_{fft}-1})| \\ \vdots & \ddots & \vdots \\ |\tilde{h}(N_{sc}, f_0)| & \ldots & |\tilde{h}(N_{sc}, f_{N_{fft}-1})| \end{bmatrix} \quad (4)$$

where $\tilde{h}(k, f_n)$ is the $n_{th}$ frequency component for $k_{th}$ subcarrier index after FFT.

The data within the Doppler spectrum matrix may therefore be indicative of shifts in incoming received waves over a multipath channel. These shifts in turn indicate the movement of an object (e.g., a human) across time and space. For example, the $n^{th}$ reflected wave with amplitude ($c_n$) and phase ($\phi_n$) arrive from an angle ($\alpha_n$) relative to the direction of movement of the human. The Doppler shift of this wave may be expressed as:

$$\Delta f_n = \frac{v}{\lambda} \cos \alpha_n \quad (7)$$

where v is the speed of the human that is moving. The data points within the Doppler spectrum matrix may therefore include the information for determining human presence based on reflected wireless signals from a moving human.

The processing logic can extract frequency components from the data stream in the frequency domain, e.g., the Doppler spectrum matrix, $H_{freq}$, which are indicative of the movement of a human, to generate Doppler spectrum data. For example, in one embodiment, the frequency components of DC and above 30 Hz may be dropped out to reduce the size of an input feature vector (discussed below) as only motion is useful info for classification. Then the matrix values may stacked into a one-dimensional vector as illustrated in Equation (5).

$$Y_{freq} = [|h(1,f_1)| \ldots |h(1,f_{30\,Hz})| \ldots |h(N_{sc},f_1)| \ldots |h(N_{sc},f_{N_{fft}})|] \quad (5)$$

Additional reference will be made to this one-dimensional vector later.

The processing logic can extract, from the filtered data for the subcarrier, statistical parameter values over a time period and within the time domain. The statistical parameter values may include one or more of a maximum value, a minimum value, a mean value, a variance value, an entropy value, a mean cross rate value, a skewness value, or a kurtosis value, each of which is defined in more detail below. The processing logic can combine these statistical parameter values into a second one-dimensional vector, to generate a combined vector of the statistical parameter values for each subcarrier. In another embodiment, the processing logic generates statistical parameter values of the FFT results.

The statistical parameter values may be useable as feature values to define the supervised ML model 158, particularly in the case of an SVM model. More specifically, by combining the time-domain-based statistical parameter values as features, a machine learning classifier may separate new testing data in a hyper-dimensional plane with more accuracy. For example, if the regularization technique is utilized to generate an SVM machine learning model, the contribution or weighting of these features may be emphasized or de-emphasized with hyper-parameters (e.g., statistical parameters per hyper-plane for each subcarrier) to avoid the overfitting in the optimization process upon application of the supervised ML model 158. Similarly, by combining the frequency-domain-based statistical parameter values as features, the machine learning classifier can separate new testing data in a hyper-dimensional plane with more accuracy.

In various embodiments, the maximum and minimum values per subcarrier may be the maximum and minimum value of the magnitude of complex CSI $h(k, t_n)$ over time period T. The mean value of $h(k, t_n)$ per subcarrier over time period T may be defined as Equation (6):

$$\mu(k) = \frac{1}{N} \sum_{t_n \in T} |h(k, t_n)| \tag{7}$$

In one embodiment, the variance value per subcarrier may be defined as $$\text{var}(k) = \frac{1}{N-1} \sum_N [|h(k, t_n)| - \mu]^2 \tag{8}$$

where there are N samples for the time period T.

The magnitude of $h(k, t_n)$ over time period T may have N samples and can construct an $N_{sc} \times N$ matrix H like a two-dimensional image, given in Equation (9).

$$H = \begin{bmatrix} |h(1, t_1)| & \cdots & |h(1, t_N)| \\ \vdots & \ddots & \vdots \\ |h(N_{sc}, t_1)| & \cdots & |h(N_{sc}, t_N)| \end{bmatrix} \tag{9}$$

From the matrix, H, the processing logic may remove the stationary objects within the scene through the subtraction of the mean of the sampled time period ($H_{mean}$) and normalize the data to a grayscale image (all entries are between 0 and 1) $I_{gray}$.

In one embodiment, the processing logic CSI entropy value may be computed with the formula of the image entropy $$\text{Entropy} = -\sum_{All(m,n)} I_{gray}(m, n) * \log_2(I_{gray}(m, n)) \tag{10}$$

where (m,n) is the entry of the $m_{th}$ row and $n_{th}$ column of gray scale image. Mean cross rate value per subcarrier may count the number of crossings (in the positive direction) of $h(k, t_n)$ through the mean valued $\mu$ for the specified time period, T.

Skewness is a measure of the asymmetry of the data around the sample mean. If skewness is negative, the data are spread out more to the left of the mean than to the right. If skewness is positive, the data are spread out more to the right. The skewness value of the normal distribution (or any perfectly symmetric distribution) is zero.

Therefore, in one embodiment, the skewness feature per subcarrier may be defined as expressed in Equation (11).

$$s(k) = \frac{\frac{1}{N} \sum_N [|h(k, t_n)| - \mu]^3}{\left\{ \sqrt{\frac{1}{N} \sum_N [|h(k, t_n)| - \mu]^2} \right\}^3} \tag{11}$$

Kurtosis is a measure of how outlier-prone a distribution is of a dataset. The kurtosis value of the normal distribution is three. Distributions that are more outlier-prone than the normal distribution have a kurtosis value greater than three, e.g., distributions that are less outlier-prone have kurtosis values less than three. Kurtosis may be expressed by the following Equation (12).

$$Kr(k) = \frac{\frac{1}{N} \sum_N [|h(k, t_n)| - \mu]^4}{\left\{ \frac{1}{N} \sum_N [|h(k, t_n)| - \mu]^2 \right\}^2} \tag{12}$$

The processing logic can combine (e.g., stack) the feature values (within the second vector) with the Doppler spectrum data (within the first vector) within a one-dimensional (1D) resultant vector, e.g., one-dimensional vector. The processing logic may continue with the processing logic labeling the data points within the 1D resultant vector with known classification statuses, to generate a labeled training dataset. The labeled training dataset may continue to be updated through future feedback from the classification stage. The processing logic may continue with the processing logic performing supervised machine learning using the labeled training dataset, to generate a trained, supervised machine learning model. The trained, supervised ML model may then be applied during classification.

In various embodiments, the training stage may be performed offline, e.g., by the computing device 150 within the cloud. These operations may be referred to as data pre-processing, e.g., the preparation of the CSI stream for machine learning according to a supervised ML model such as support vector machines (SVM) or other classification-based or regression-based learning models.

In machine learning, support vector machines (SVMs, support vector networks) are supervised learning models with associated learning algorithms that analyze data used for classification and regression analysis. Given a set of training examples, each marked as belonging to one or the other of at least two categories, an SVM training algorithm builds a model that assigns new examples to one category or the other, making it a non-probabilistic binary linear classifier (although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on which side of the gap they fall.

In addition to performing linear classification, SVMs may efficiently perform a non-linear classification using what is called the kernel trick, implicitly mapping their inputs into high-dimensional feature spaces. When data are not labeled, supervised learning is not possible, and an unsupervised learning approach may be instead be employed, which attempts to find natural clustering of the data to groups, and then maps new data to these formed groups. The clustering algorithm that provides an improvement to the SVMs is called support vector clustering and is used in industrial applications either when data are not labeled or when only some data are labeled as a pre-processing for a classification pass.

The processing logic may continue, within the classification stage, to receive first data indicative of channel properties of a communication link between a wireless receiver (e.g., in the wireless detector 184) and a wireless transmitter (e.g., in the AP device 190). In one embodiment, the first data is a CSI stream, but RSSI data may also be included. This "first" data may be data received in real-time and for which a presence detection is to be performed with reference to the room in the building. The operations may also be extended to cover additional rooms within the building. As will be apparent, the pre-processing steps within the classification stage match those performed during the training stage; accordingly, detailed explanations will not be repeated with reference to the latter.

The processing logic can perform interpolation of the first data to obtain interpolated data. The interpolated data may include equidistant data points that embody the channel properties, e.g., to provide a smoothing effect to the first data. The processing logic can filter the interpolated data with an infinite impulse response (IIR) filter to generate filtered data having reduced noise compared to the interpolated data.

The processing logic can execute an FFT on the filtered data to generate a data stream in the frequency domain. The processing logic can extract frequency components from the data stream in the frequency domain, e.g., the Doppler spectrum matrix, $H_{freq}$, which are indicative of the movement of a human, to generate Doppler spectrum data. The frequency components may include data points located between DC and approximately 30 Hz.

The processing logic can extract, from the filtered data for the subcarrier, statistical parameter values over a time period and within the time domain. The statistical parameter values may include one or more of a maximum, a minimum, a mean, a variance, entropy, a mean cross rate, skewness, or kurtosis, each of which was defined above. The processing logic can combine these statistical parameter values into a one-dimensional vector, to generate a combined vector of the statistical parameter values for each subcarrier, where the statistical parameter values are useable as feature values to define the supervised ML model. The processing logic can stack the statistical parameter values with the Doppler spectrum data within a one-dimensional (1D) resultant vector, e.g., a larger one-dimensional vector containing the feature values, to generate a dataset for the supervised ML model 158 that includes both time domain and frequency domain values. For example, the processing logic may stack the variance with the Doppler spectrum according to Equation (14). Similarly, other statistical parameters from Equation (5)-(13) may be stacked to obtain a larger size feature vector for ML.

$Y_{feature}=[|\tilde{h}(1,f_1)| \ldots |\tilde{h}(1,f_{30\ Hz})| \ldots |\tilde{h}(N_{sc},f_1)| \ldots |\tilde{h}(N_{sc},f_{N_{fft}})|\text{var}(1) \ldots \text{var}(N_{sc})]$ $Y_{feature}=[|\tilde{h}(1,f_1)| \ldots |\tilde{h}(1,f_{30\ Hz})| \ldots |\tilde{h}(N_{sc},f_1)| \ldots |\tilde{h}(N_{sc},f_{N_{fft}})|\text{var}(1) \ldots \text{var}(N_{sc})]$ (14)

The processing logic can classify, via execution of the trained, supervised ML model, data of the dataset to distinguish the movement within the building from stationary objects, which results in a presence detection or detection of idle channels. The presence detection may be indicative of the presence of a human. In another embodiment, the results can be motion detection or non-motion detection. In one embodiment, the pre-processing of blocks is skipped. While skipping the inclusion of time-domain statistical parameters may create a less rich dataset, such a simplified embodiment may still be employed, and thus classification may be performed on the Doppler spectrum data (instead of the dataset) using the supervised ML model.

The processing logic can output a presence decision (or motion or no-motion decision) with reference to at least a portion of the incoming CSI stream. In one embodiment, the presence decision is binary, e.g., "presence detected" or "presence not detected," although the decision may be indicated with a non-binary value in other embodiments. In addition, multiple presence decisions may be output over a shifting time window to avoid a false-negative detection.

In another embodiment, assuming a number of receiver-transmitter links, Nrt and a number of subcarriers, Nsc, then a CSI vector is a complex vector of length Nsc along a link between a receiver and a transmitter. Only the magnitude of the complex entries in the vector can be considered. A CSI capture is a matrix obtained by stacking the CSI vectors along all the links. Denote the ith capture by $H_i$. Then $H_i$ is a matrix of size Nsc×Nrt. Also, denote the ith CSI vector along link l by $H_{i,l}$ and the sequence of CSI vectors along link l by $H_i$. Overall, $H_{i,l}$ is a 3D tensor of size I×Nsc×Nrt.

From the sequence of CSI vectors $H_{i,l}$, the processing logic constructs a sequence of CSI frames $X_{i,l}$ by sliding a window of a fixed size and a fixed stride along the sequence of CSI vectors along each link. It should be noted that the ith CSI frame along link l, $X_{i,l}$ is a matrix with Nsc rows and the number of columns equal to the length of the sliding window. The (j,k)th element of this matrix is given by $X_{i,l}(j, k)$.

In at least one embodiment, the statistic parameter values used to validate a CSI frame can include the following equations for the temporal mean along the jth subcarrier (15):

$$\mu_{i,l}(j) = \frac{\sum_k X_{i,l}(j, k)}{\text{sliding window size}} \quad (15)$$

The temporal variation along the jth subcarrier (16):

$$\sigma_{i,l}^2(j) = \frac{\sum_k (X_{i,l}(j, k) - \mu_{i,l})^2}{\text{sliding window size}} \quad (16)$$

The temporal variation along the jth subcarrier (16):

$$\sigma_{i,l}^2(j) = \frac{\sum_k (X_{i,l}(j, k) - \mu_{i,l})^2}{\text{sliding window size}} \quad (16)$$

In another embodiment, the pre-processing of a CSI frame can include subcarrier spacing, subcarrier (spatial) normalization, temporal normalization, 2D FFT plus shifting and log transform, cropping the temporal dimension, and removing the first and last few columns. FIGS. 5A-5F illustrate a CSI frame during no-motion undergoing pre-processing, according to at least one embodiment. FIGS. 6A-6F illustrate a CSI frame during motion undergoing pre-processing, according to at least one embodiment.

Figure 5A:
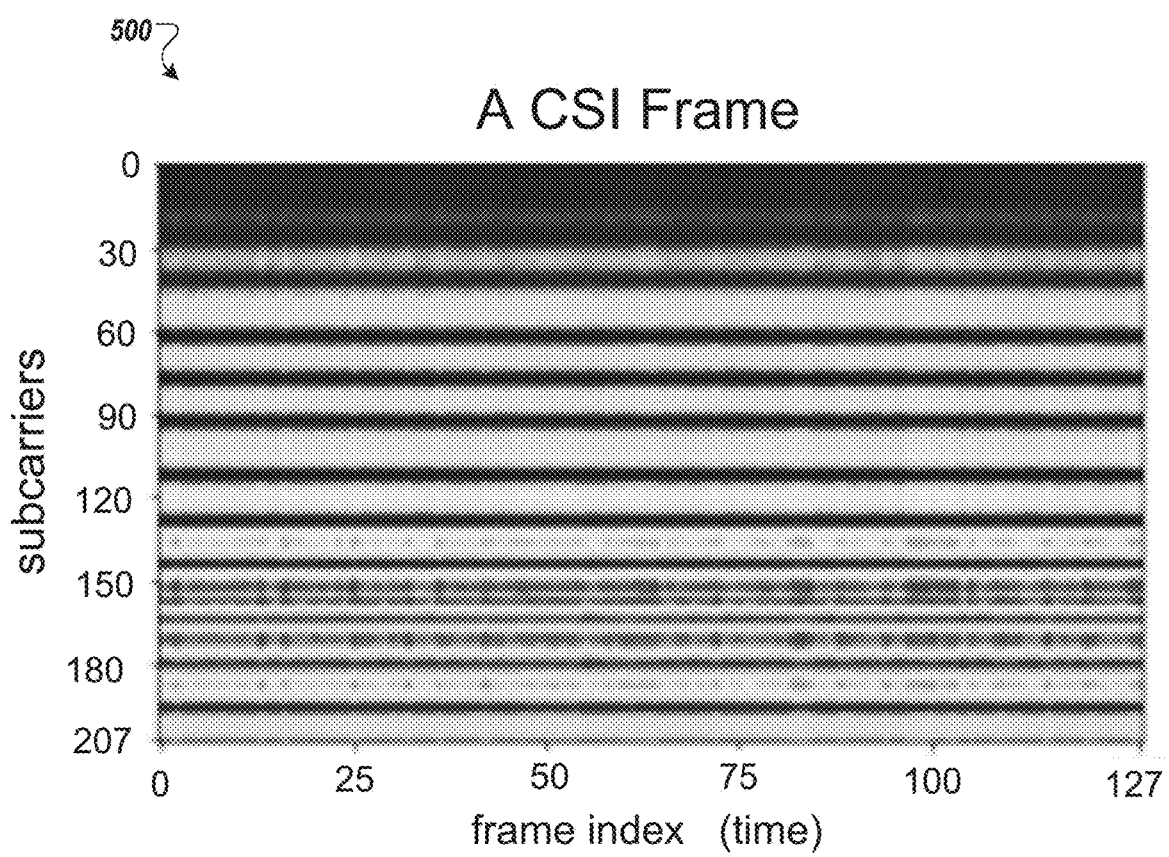
FIGS. 5A-5F illustrate a CSI frame during no-motion undergoing pre-processing, according to at least one embodiment.
Figure 5B:
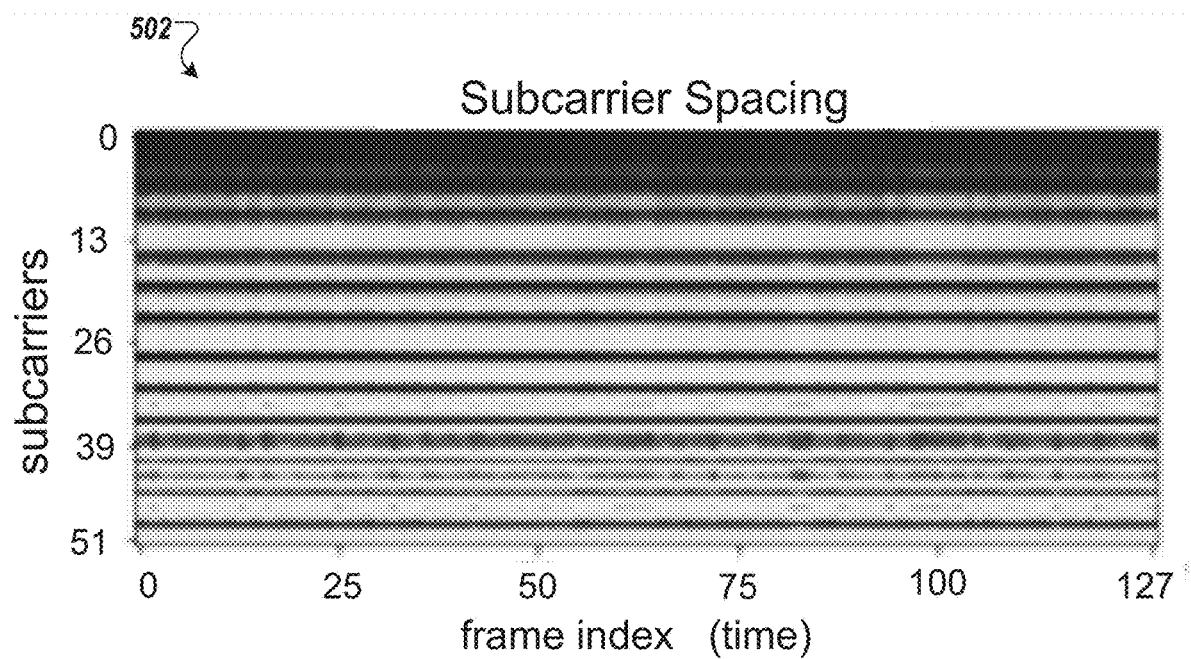

FIG. 5A illustrates a CSI frame 500 during no-motion before pre-processing according to at least one embodiment. The processing logic can perform subcarrier spacing. For example, given a CSI frame of $X_1 = X_{i,j}$, a subcarrier spacing can be done by taking every sth subcarrier: $X_2(j, k) = X_1(4j-3, k)$. This can remove redundant subcarriers and reduce memory complexity. FIG. 5B illustrates a CSI frame 502 during no-motion pre-processed with subcarrier spacing according to at least one embodiment. For subcarrier (spatial) normalization, the processing logic can do a 2-norm normalization across subcarriers:

$$X_3(j, k) = \frac{X_2(j, k)}{\left(\sum_j X_2(j, k)^2\right)^{1/2}}.$$

This can smooth the values across subcarriers and time.

Figure 5C:
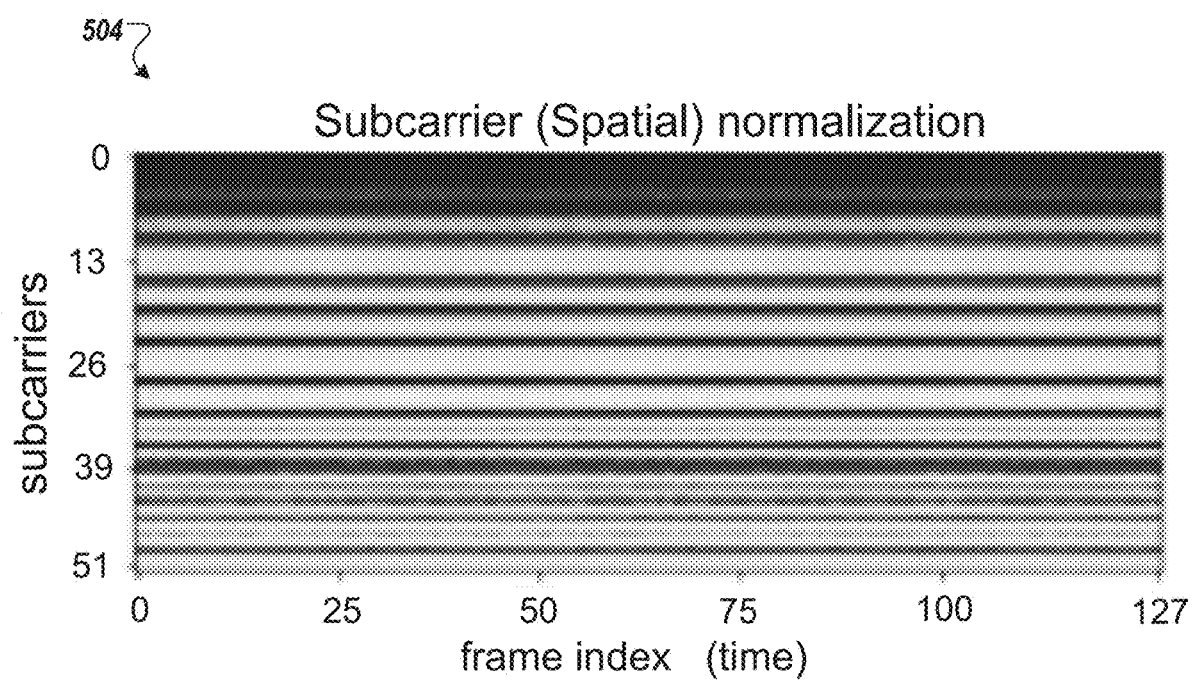

FIG. 5C illustrates a CSI frame 504 during no-motion pre-processed with subcarrier (spatial) normalization according to at least one embodiment. For temporal normalization, the processing logic can perform elementwise division of all columns by the first column:

$$X_4(j, k) = \frac{X_3(j, k)}{X_3(j, 1)}.$$

Figure 5D:
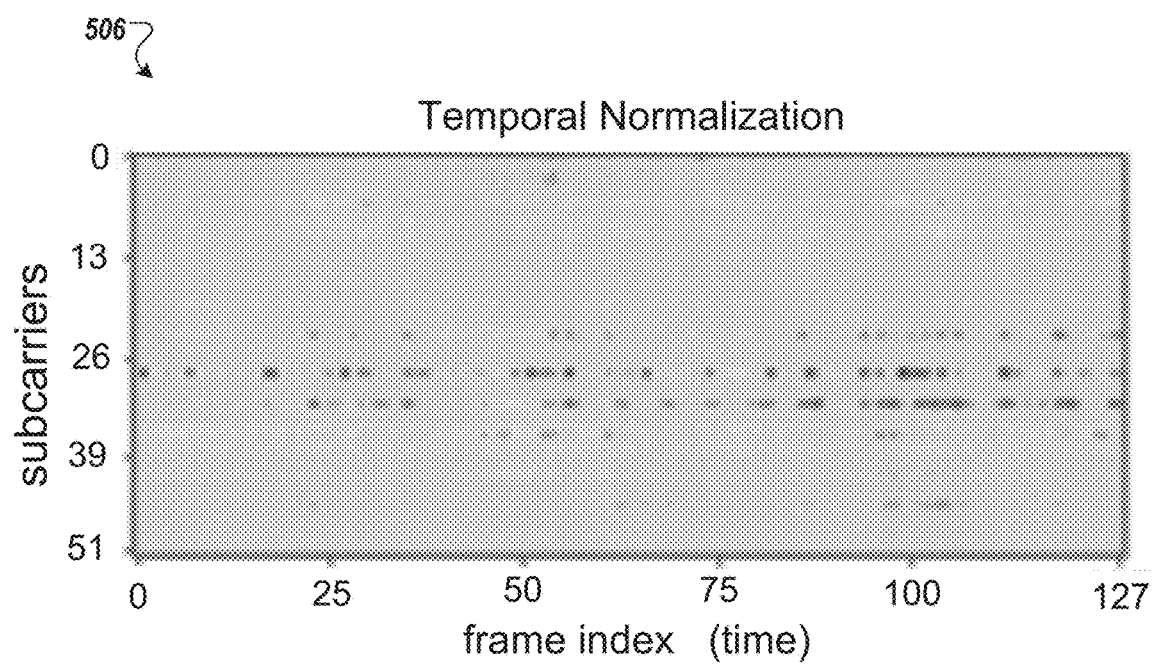
Figure 5E:
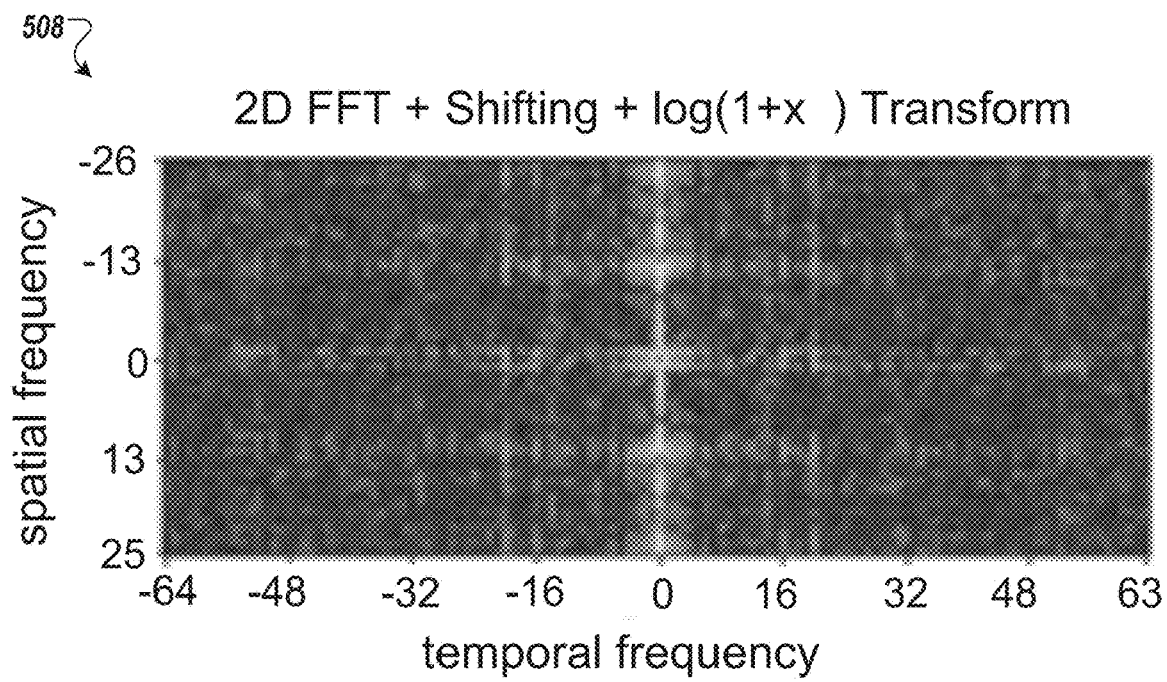
Figure 5F:
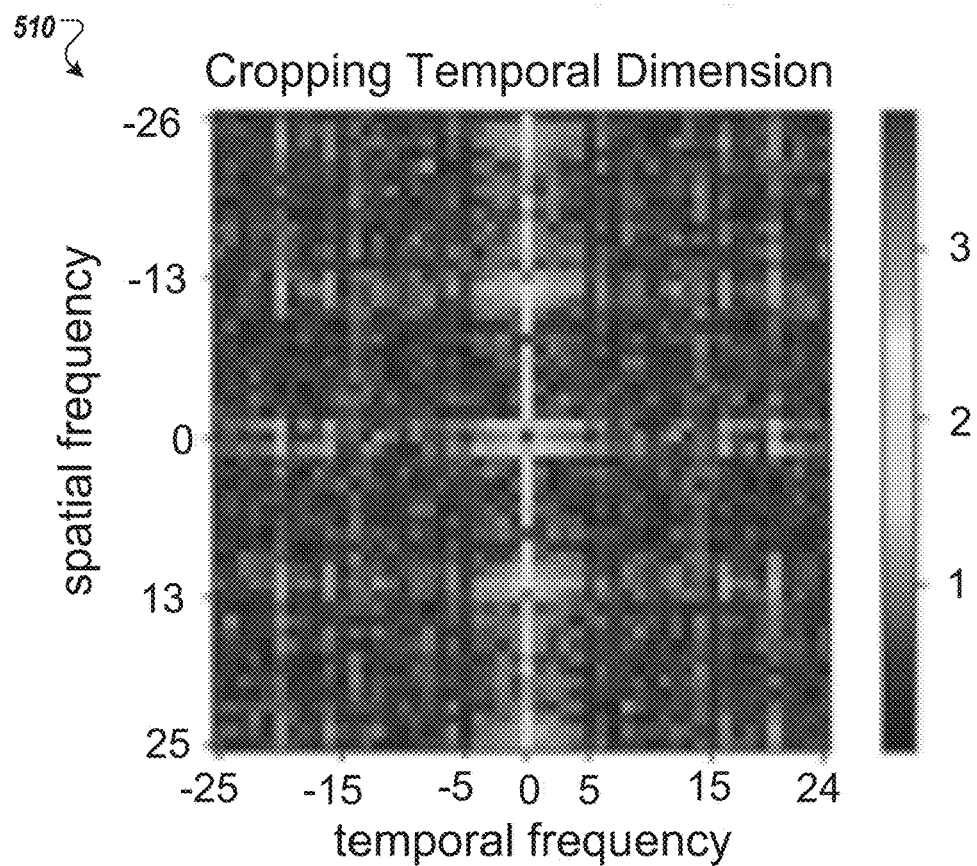

This can increase the robustness of the ML models. FIG. 5D illustrates a CSI frame 506 during no-motion pre-processed with temporal normalization according to at least one embodiment. For 2D FFT plus shifting and log transform, the processing logic can apply 2D FFT, obtain magnitude, shift the result so that zero frequency is at the center of the image and apply a function: $\tilde{X}_4 = \lceil 2DFFT(X_4) \rceil$ such that zero frequency is shifted at the center and $X_5 = \log(1 + X_4(j,k))$. This can change the values to the frequency domain to analyze spectral features and reduce disparity among magnitude values. FIG. 5E illustrates a CSI frame 508 during no-motion pre-processed with 2D FFT plus shifting and log transform according to at least one embodiment. For cropping temporal dimension, the processing logic can remove the high temporal frequencies: $X_6$=remove first and last few columns of $X_5$. This can prevent sudden changes in CSI due to hardware problems, or the like, from affecting the ML model training. The final results can be denoted as $X_6$ by $Y_{i,j}$. FIG. 5F illustrates a CSI frame 510 during no-motion pre-processed with cropping temporal dimension according to at least one embodiment.

Figure 6A:
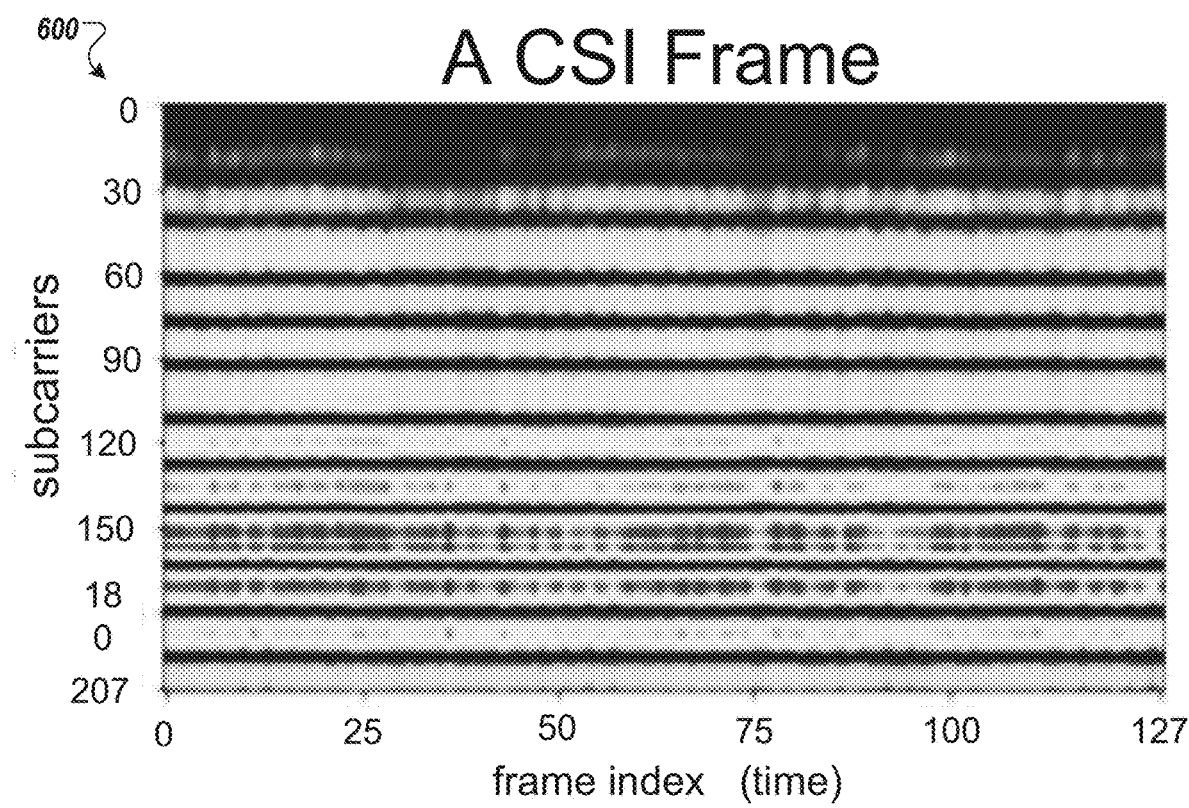
FIGS. 6A-6F illustrate a CSI frame during motion undergoing pre-processing, according to at least one embodiment.
Figure 6B:
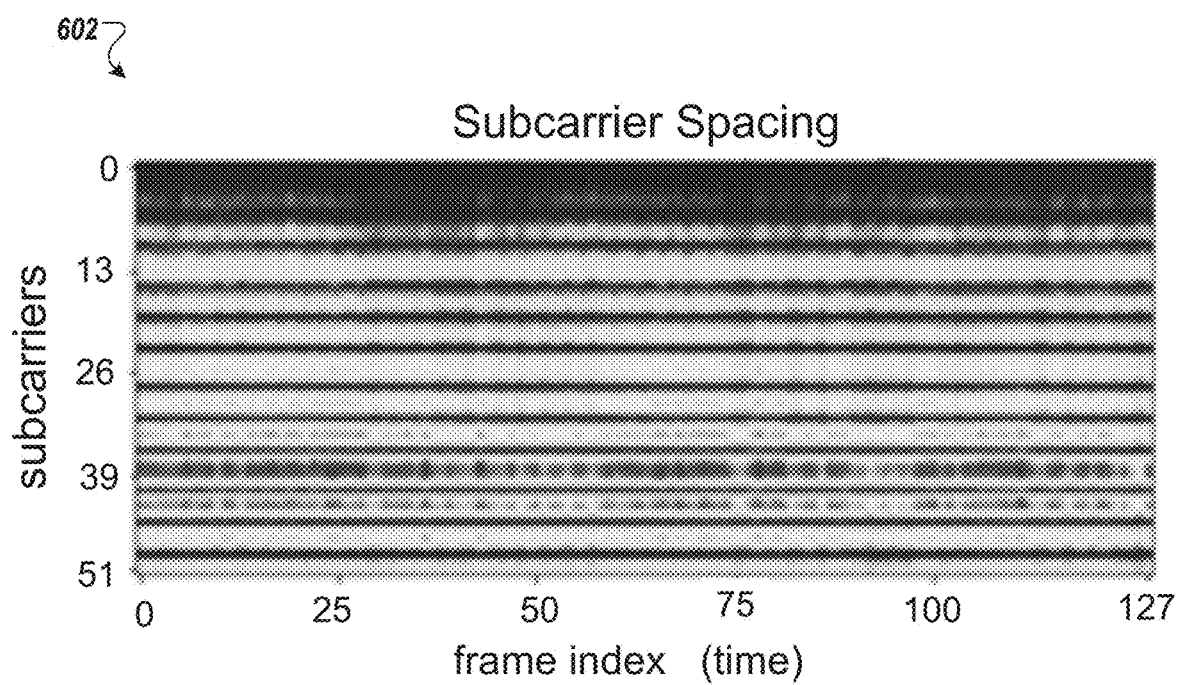
Figure 6C:
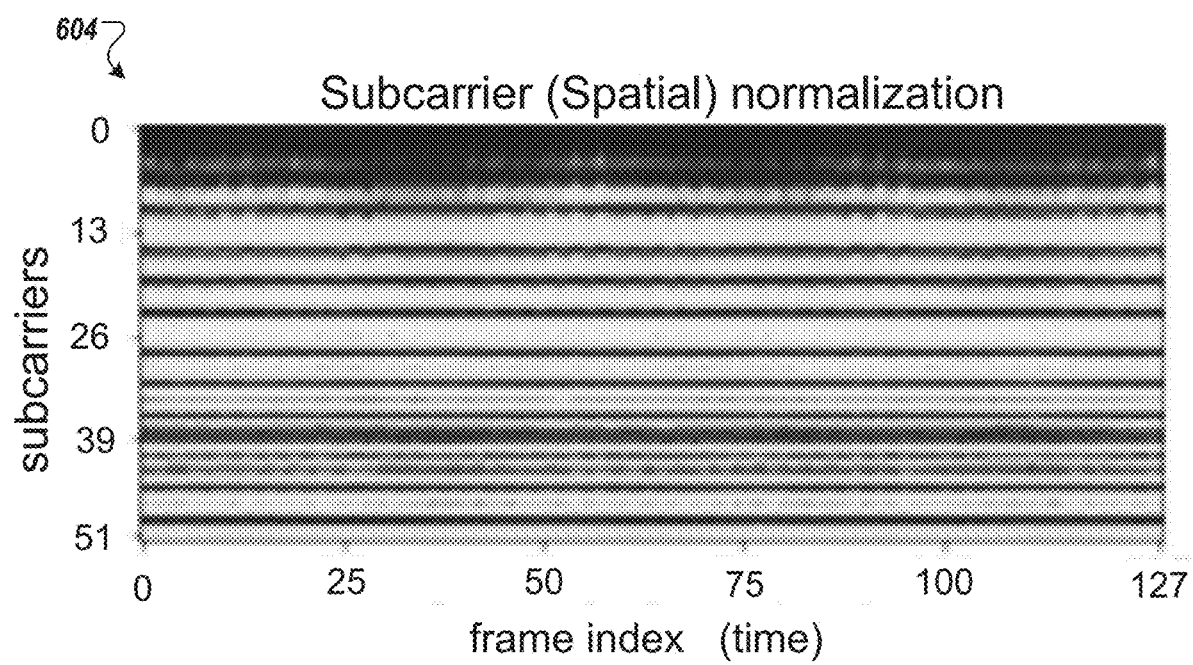
Figure 6D:
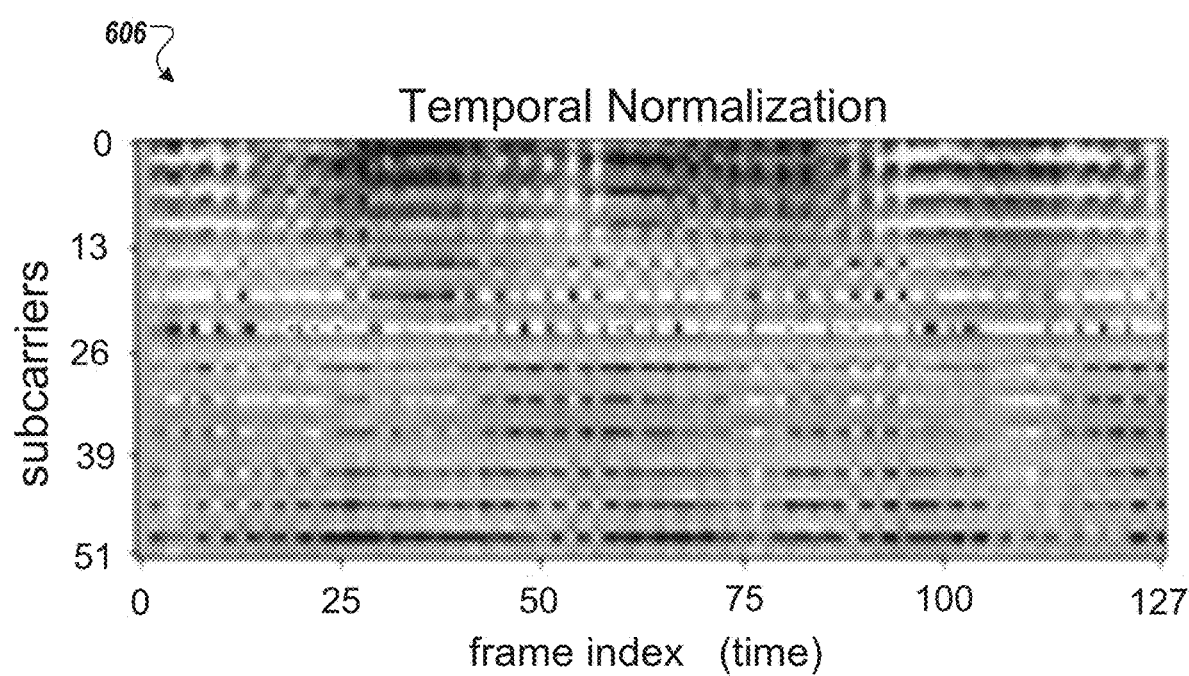
Figure 6E:
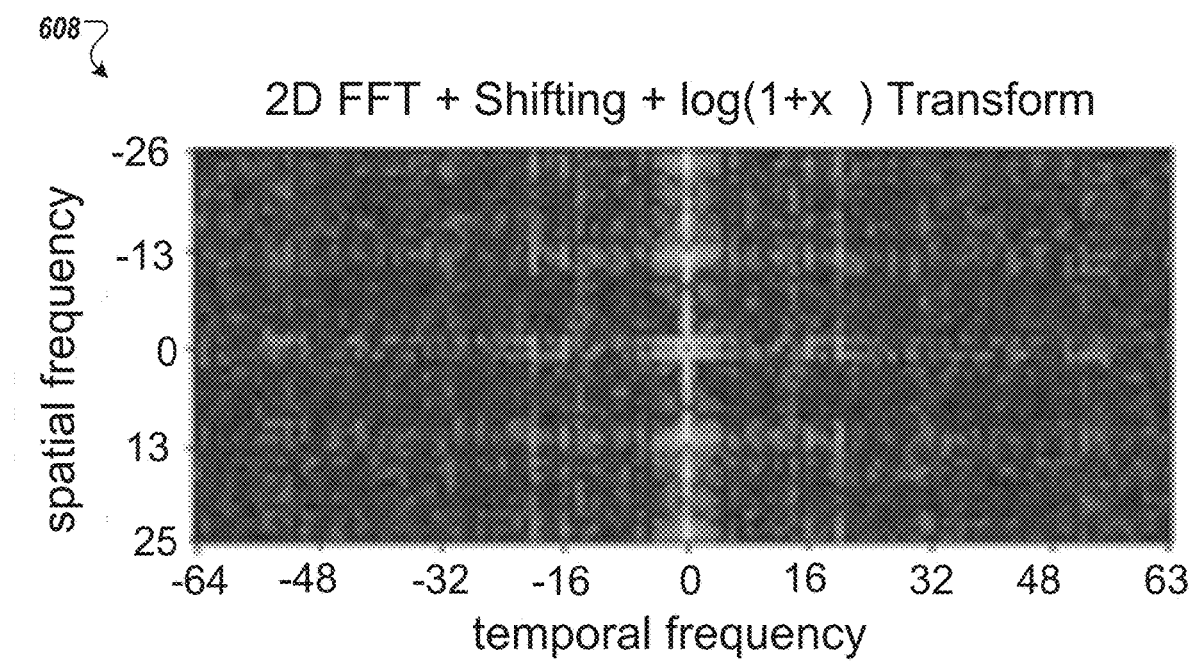
Figure 6F:
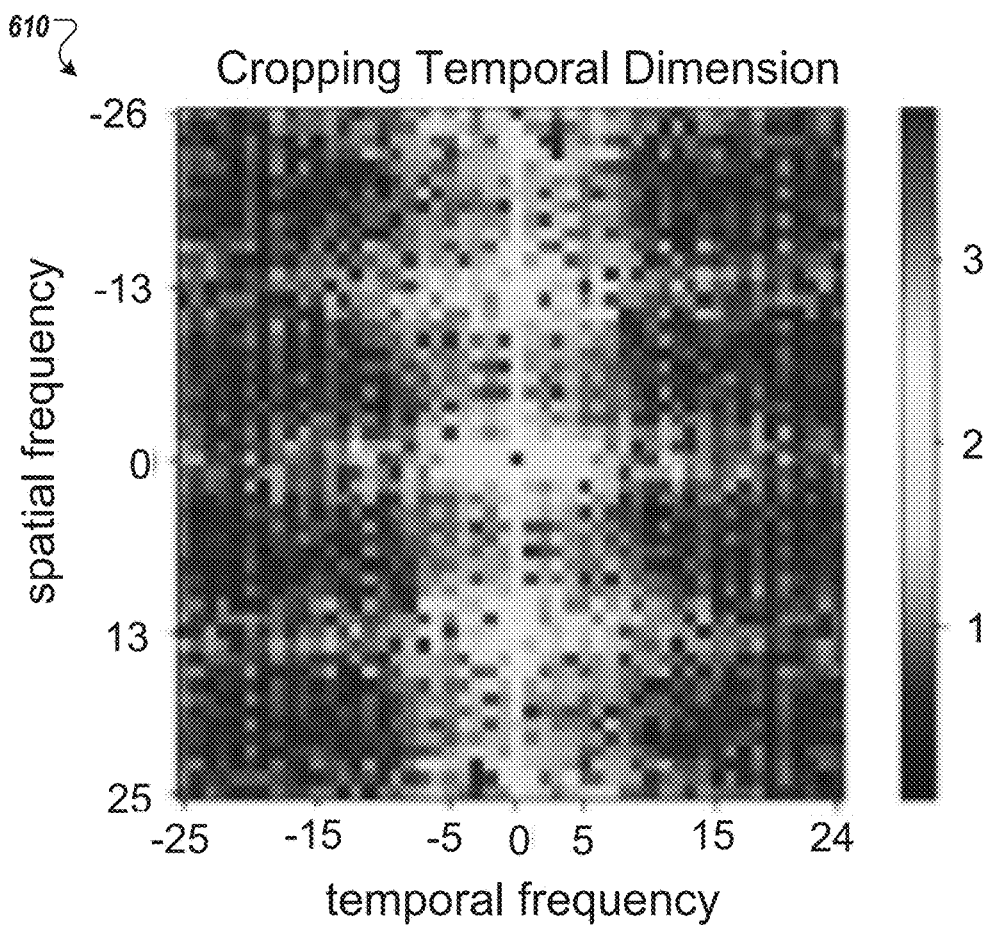

For comparisons, FIG. 6A illustrates a CSI frame 600 during motion before pre-processing according to at least one embodiment. FIG. 6B illustrates a CSI frame 602 during motion pre-processed with subcarrier spacing according to at least one embodiment. FIG. 6C illustrates a CSI frame 604 during motion pre-processed with subcarrier (spatial) normalization according to at least one embodiment. FIG. 6D illustrates a CSI frame 606 during motion pre-processed with temporal normalization according to at least one embodiment. FIG. 6E illustrates a CSI frame 608 during motion pre-processed with 2D FFT plus shifting and log transform according to at least one embodiment. FIG. 6F illustrates a CSI frame 610 during motion pre-processed with cropping temporal dimension according to at least one embodiment.

In at least one embodiment, an ML model can take the pre-processed CSI frame (or a sequence of it) as input and predict a binary label (or a sequence of it) as output. The binary label can correspond to a presence of motion or not.

Figure 7:
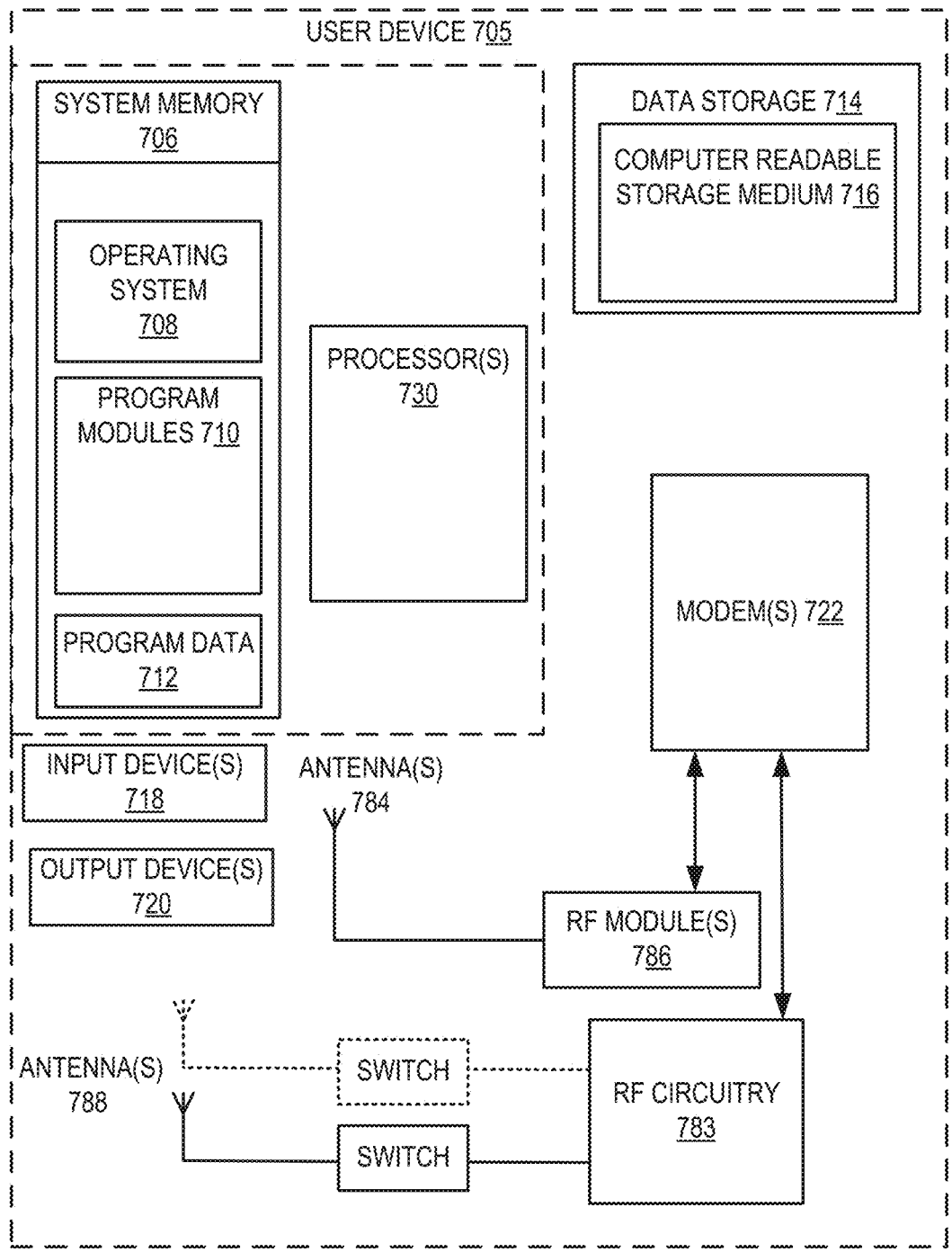
FIG. 7 is a block diagram of a user device in which embodiments of dynamic memory allocation for device power savings may be implemented.

FIG. 7 is a block diagram of a user device 705 in which embodiments of dynamic memory allocation for device power savings may be implemented. The user device 705 may correspond to the wireless device 100 of FIG. 1A, the wireless device 120 of FIG. 1B, wireless detector 184, the access point device 190, or the computing device 150 of FIG. 1C. The user device 705 may be any type of computing devices such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 705 may be any portable or stationary user device. For example, the user device 705 may be an intelligent voice control and speaker system. Alternatively, the user device 705 can be any other device used in a WLAN network (e.g., Wi-Fi® network), a WAN network, or the like.

The user device 705 includes one or more processor(s) 730, such as one or more CPUs, microcontrollers, field-programmable gate arrays, or other types of processors. The user device 705 also includes system memory 706, which may correspond to any combination of volatile and/or non-volatile storage mechanisms. The system memory 706 stores information that provides operating system component 708, various program modules 710, program data 712, and/or other components. In one embodiment, the system memory 706 stores instructions of the methods as described herein. The user device 705 performs functions by using the processor(s) 730 to execute instructions provided by the system memory 706.

The user device 705 also includes a data storage device 714 that may be composed of one or more types of removable storage and/or one or more types of non-removable storage. The data storage device 714 includes a computer-readable storage medium 716 on which is stored one or more sets of instructions embodying any of the methodologies or functions described herein. Instructions for the program modules 710 may reside, completely or at least partially, within the computer-readable storage medium 716, system memory 706 and/or within the processor(s) 730 during execution thereof by the user device 705, the system memory 706, and the processor(s) 730 also constituting computer-readable media. The user device 705 may also include one or more input devices 718 (keyboard, mouse device, specialized selection keys, etc.) and one or more output devices 720 (displays, printers, audio output mechanisms, etc.).

The user device 705 further includes a modem 722 to allow the user device 705 to communicate via a wireless network (e.g., such as provided by the wireless communication system) with other computing devices, such as remote computers, an item providing system, and so forth. The modem 722 can be connected to RF circuitry 783 and zero or more RF modules 786. The RF circuitry 783 may be a WLAN module, a WAN module, a PAN module, or the like. Antennas 788 are coupled to the RF circuitry 783, which is coupled to the modem 722. Zero or more antennas 784 can be coupled to one or more RF modules 786, which are also connected to the modem 722. The zero or more antennas 784 may be GPS antennas, NFC antennas, other WAN antennas, WLAN or PAN antennas, or the like. The modem 722 allows the user device 705 to handle both voice and non-voice communications (such as communications for text messages, multimedia messages, media downloads, web browsing, etc.) with a wireless communication system. The modem 722 may provide network connectivity using various types of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc., although not all of these mobile network technologies may be available.

The modem 722 may generate signals and send these signals to antenna 788, and 784 via RF circuitry 783, and RF module(s) 786 as described herein. User device 705 may additionally include a WLAN module, a GPS receiver, a PAN transceiver and/or other RF modules. These RF modules may additionally or alternatively be connected to one or more of antennas 784, 788. Antennas 784, 788 may be configured to transmit in different frequency bands and/or using different wireless communication protocols. The antennas 784, 788 may be directional, omnidirectional, or non-directional antennas. In addition to sending data, antennas 784, 788 may also receive data, which is sent to appropriate RF modules connected to the antennas.

In one embodiment, the user device 705 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna building that operates at a first frequency band, and the second wireless connection is associated with a second resonant mode of the antenna building that operates at a second frequency band. In another embodiment, the first wireless connection is associated with a first antenna element, and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 722 is shown to control transmission and reception via the antenna (784, 788), the user device 705 may alternatively include multiple modems, each of which is configured to transmit/receive data via a different antenna and/or wireless transmission protocol.

The user device 705 delivers and/or receives items, upgrades, and/or other information via the network. For example, the user device 705 may download or receive items from an item-providing system. The item-providing system receives various requests, instructions, and other data from the user device 705 via the network. The item-providing system may include one or more machines (e.g., one or more server computer systems, routers, gateways, etc.) that have processing and storage capabilities to provide the above functionality. Communication between the item-providing system and the user device 705 may be enabled via any communication infrastructure. One example of such an infrastructure includes a combination of a wide area network (WAN) and wireless infrastructure, which allows a user to use the user device 705 to purchase items and consume items without being tethered to the item providing system via hardwired links. The wireless infrastructure may be provided by one or multiple wireless communications systems, such as one or more wireless communications systems. For example, one of the wireless communication systems may be a WLAN hotspot connected with the network. The WLAN hotspots can be created by Wi-Fi® products based on IEEE 802.11x standards by Wi-Fi Alliance. Another wireless communication system may be a wireless carrier system that can be implemented using various data processing equipment, communication towers, etc. Alternatively, or in addition, the wireless carrier system may rely on satellite technology to exchange information with the user device 705.

The communication infrastructure may also include a communication-enabling system that serves as an intermediary in passing information between the item-providing and wireless communication systems. For example, the communication-enabling system may communicate with the wireless communication system (e.g., a wireless carrier) via a dedicated channel. In addition, it may communicate with the item-providing system via a non-dedicated communication mechanism, e.g., a public Wide Area Network (WAN) such as the Internet.

The user devices 705 are variously configured with different functionality to enable the consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multimedia content. In addition, the user devices 705 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. However, it will be apparent to one of ordinary skill in the art having the benefit of this disclosure that embodiments may be practiced without these specific details. In some instances, well-known buildings and devices are shown in block diagram form rather than in detail to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required building for a variety of these systems will appear from the description below. In addition, the present embodiments are not described with reference to any particular programming language. However, it will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:
a first integrated circuit (IC); and
a second IC coupled to the first IC,
wherein the first IC:
receives, from the second IC, a first set of channel state information (CSI) values at a first periodicity while the first IC is operating in a first power range, wherein the CSI values are associated with a wireless channel between the wireless device and a second wireless device;
at a first time, determines that i) the first IC is operating in a second power range that is lower than the first power range or ii) an amount of first data to be sent to the second wireless device is less than a threshold value;
receives, from the second IC, a second set of the CSI values at a second periodicity, wherein the second periodicity is less than the first periodicity;
at a second time after the first time, determines that iii) the first IC is operating in the first power range or iv) the amount of the first data to be sent to the second wireless device is equal to or greater than the threshold value;
and
receives, from the second IC, a third set of the CSI values at the first periodicity.

2. The wireless device of claim 1, wherein:
the first IC sends third data to the second IC, the third data comprising a first parameter value that specifies a transfer interval corresponding to the second periodicity and a second parameter value that specifies an amount of memory to reserve for the second set of CSI values; and
the second IC sends the second set of the CSI values at the end of the transfer interval.

3. The wireless device of claim 1, wherein, at a third time after the first time, the first IC:
determines that v) the first IC is operating in the first power range and vi) the amount of the first data to be sent to the second wireless device is less than the threshold value; and
causes the second IC to send the third set of the CSI values to the first IC at the second periodicity.

4. A method comprising, by a first wireless device having a radio and a processing device:
receiving, by the radio, first data from the processing device;
sending, by the radio, the first data to a second wireless device over a wireless channel;
measuring, by the radio, first channel state information (CSI) values that represent channel properties of the wireless channel;
sending, by the radio, the first CSI values to the processing device with a first periodicity;
receiving, by the radio, second data from the processing device, wherein the second data specifies a transfer interval and an amount of memory to reserve in a memory buffer for second CSI values measured during the transfer interval;
measuring, by the radio, the second CSI values; and
sending, by the radio, the second CSI values to the processing device at the end of the transfer interval.

5. The method of claim 4, further comprising:
receiving, by the radio from the processing device, an indication that subsequent CSI values be sent with the first periodicity; and
sending the subsequent CSI values to the processing device with the first periodicity.

6. The method of claim 4, wherein the second data comprises an indication that the processing device operates in a second power range that is less than a first power range in which the processing device receives the first CSI values.

7. The method of claim 4, wherein the second data comprises an indication that the amount of the first data is less than a threshold value.

8. The method of claim 4, wherein the second data comprises a first indication that the amount of the first data is less than a threshold value and a second indication that the processing device operates in a second power range that is less than a first power range in which the processing device receives the first CSI values.

9. The method of claim 4, further comprising:
determining that the processing device is operating in a first power range after operating in a second power range;
receiving, by the radio, third data from the processing device, wherein the third data specifies subsequent CSI values be sent with the first periodicity; and
sending the subsequent CSI values to the processing device with the first periodicity.

10. A wireless device comprising:
a wireless local area network (WLAN) chipset comprising a plurality of memory buffers, the WLAN chipset to communicate with a second wireless device over a wireless channel; and
an integrated circuit (IC) coupled to the WLAN chipset, wherein the IC is to:
send first data to the WLAN chipset, the WLAN chipset to store the first data in the plurality of memory buffers before transmitting;
receive first channel state information (CSI) values that represent channel properties of the wireless channel from the WLAN chipset;
send second data to the WLAN chipset; and
receive second CSI values from the WLAN chipset after a specified interval has elapsed.

11. The wireless device of claim 10, wherein the IC is to send the second data in response to a determination that the IC is operating in a second power range lower than a first power range in which receives the first CSI values.

12. The wireless device of claim 11, wherein the IC is further to:
determine that the IC is operating in the first power range after operating in the second power range; and
send third data to the WLAN chipset that causes the WLAN chipset to send third CSI values without being stored in the plurality of memory buffers for the specified interval; and
receive the third CSI values from the WLAN chipset.

13. The wireless device of claim 11, wherein the IC is further to:
determine that the IC is operating in the first power range after operating in the second power range;
determine that an amount of the first data to be sent to the second wireless device is less than a threshold value, the threshold value representing a minimum amount of data traffic;
send third data to the WLAN chipset that causes the WLAN chipset to store third CSI values in the plurality of memory buffers for a second specified interval; and
receive the third CSI values after the second specified interval from the WLAN chipset.

14. The wireless device of claim 11, wherein the IC is further to:
determine that an amount of the first data to be sent to the second wireless device is equal to or greater than a threshold value, the threshold value representing a minimum amount of data traffic;
send third data to the WLAN chipset that causes the WLAN chipset to send third CSI values without being stored in the plurality of memory buffers for the specified interval; and
receive the third CSI values from the WLAN chipset.

15. The wireless device of claim 14, wherein the IC is further to:
determine that the amount of the first data to be sent to the second wireless device is less than the threshold value;
send fourth data to the WLAN chipset that causes the WLAN chipset to store fourth CSI values in the plurality of memory buffers for a second specified interval; and
receive the fourth CSI values after the second specified interval from the WLAN chipset.

16. The wireless device of claim 10, wherein the IC is a System on Chip (SoC), wherein the SoC comprises a memory device to store the first CSI values and the second CSI values, wherein a capacity of the memory device is greater than a capacity of the plurality of memory buffers.

17. The wireless device of claim 10, wherein the plurality of memory buffers are transmit first-in-first-out (TX FIFO) memory buffers, wherein a driver of the WLAN chipset is to store at least a portion of the first data in the TX FIFO memory buffers before sending the first data to the second wireless device.

18. The wireless device of claim 10, wherein the plurality of memory buffers are to store at least a portion of the first data and the second CSI values concurrently.

19. The wireless device of claim 10, wherein the WLAN chipset comprises:
a network processor; and
a co-processor, wherein the co-processor is to receive the second data and cause the second CSI values to be stored in the plurality of memory buffers.

20. The wireless device of claim 10, further comprising a hardware accelerator circuit coupled to the WLAN chipset, wherein the hardware accelerator circuit is to receive the second data and cause the second CSI values to be stored in the plurality of memory buffers.

* * * * *